United States Patent
Jiang et al.

(10) Patent No.: US 10,405,074 B2
(45) Date of Patent: Sep. 3, 2019

(54) OPTICAL SIGNAL PROCESSING METHOD AND OPTICAL CROSS-CONNECT APPARATUS

(71) Applicant: Huawei Technologies Co., Ltd., Shenzhen, Guangdong (CN)

(72) Inventors: Chendi Jiang, Wuhan (CN); Xinhua Xiao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/987,461

(22) Filed: May 23, 2018

(65) Prior Publication Data

US 2018/0279024 A1 Sep. 27, 2018

Related U.S. Application Data

(63) Continuation of application No. PCT/CN2016/106708, filed on Nov. 22, 2016.

(30) Foreign Application Priority Data

Nov. 24, 2015 (CN) .......................... 2015 1 0824656

(51) Int. Cl.
*H04Q 11/00* (2006.01)
*H04B 10/032* (2013.01)

(52) U.S. Cl.
CPC ....... *H04Q 11/0005* (2013.01); *H04B 10/032* (2013.01); *H04Q 11/00* (2013.01); *H04Q 2011/005* (2013.01); *H04Q 2011/0035* (2013.01); *H04Q 2011/0039* (2013.01)

(58) Field of Classification Search
None
See application file for complete search history.

(56) References Cited

U.S. PATENT DOCUMENTS

| 6,518,811 B1 | 2/2003 | Klecka, III |
| 2003/0194236 A1* | 10/2003 | Kim .................. H04Q 11/0062 398/50 |
| 2008/0124078 A1 | 5/2008 | Fukashiro |

(Continued)

FOREIGN PATENT DOCUMENTS

| CN | 101193329 A | 6/2008 |
| CN | 102544985 A | 7/2012 |

(Continued)

*Primary Examiner* — Casey L Kretzer

(57) ABSTRACT

Embodiments of the present disclosure disclose an optical signal processing method and an optical cross-connect apparatus. The method includes: receiving, by an input port i of the optical cross-connect apparatus, a first optical signal; performing, based on the first optical signal by a transmit-end signal processing module i, first phase modulation processing and first frequency mixing processing to obtain a THz signal that carries signal information of the first optical signal; transmitting, by a transmit-end antenna i, the THz signal; receiving, by a receive-end antenna j, the THz signal; performing, based on the THz signal by a receive-end signal processing module j, second phase modulation processing and second frequency mixing processing to obtain a second optical signal that carries the signal information; and outputting, by an output port j, the second optical signal.

14 Claims, 29 Drawing Sheets

(56) References Cited

U.S. PATENT DOCUMENTS

| | | |
|---|---|---|
| 2012/0269510 A1* | 10/2012 | Hui .................. H04Q 11/0005 398/50 |
| 2014/0029944 A1 | 1/2014 | Sato et al. |
| 2014/0231627 A1 | 8/2014 | Wakatsuki et al. |
| 2015/0124187 A1 | 5/2015 | Xie et al. |
| 2015/0244071 A1 | 8/2015 | Shirakata et al. |
| 2016/0105242 A1 | 4/2016 | Wang et al. |
| 2016/0150300 A1 | 5/2016 | Sato et al. |
| 2017/0063461 A1* | 3/2017 | Prucnal ............ H04B 10/25752 |

FOREIGN PATENT DOCUMENTS

| | | |
|---|---|---|
| CN | 103609041 A | 2/2014 |
| CN | 104458645 A | 3/2015 |
| JP | H09289657 A | 11/1997 |
| JP | 2007165956 A | 6/2007 |
| JP | 2013070209 A | 4/2013 |
| JP | 2014027562 A | 2/2014 |
| JP | 2015159421 A | 9/2015 |
| WO | 2010010376 A1 | 1/2010 |
| WO | 2014078940 A1 | 5/2014 |
| WO | 2015005170 A1 | 1/2015 |

\* cited by examiner

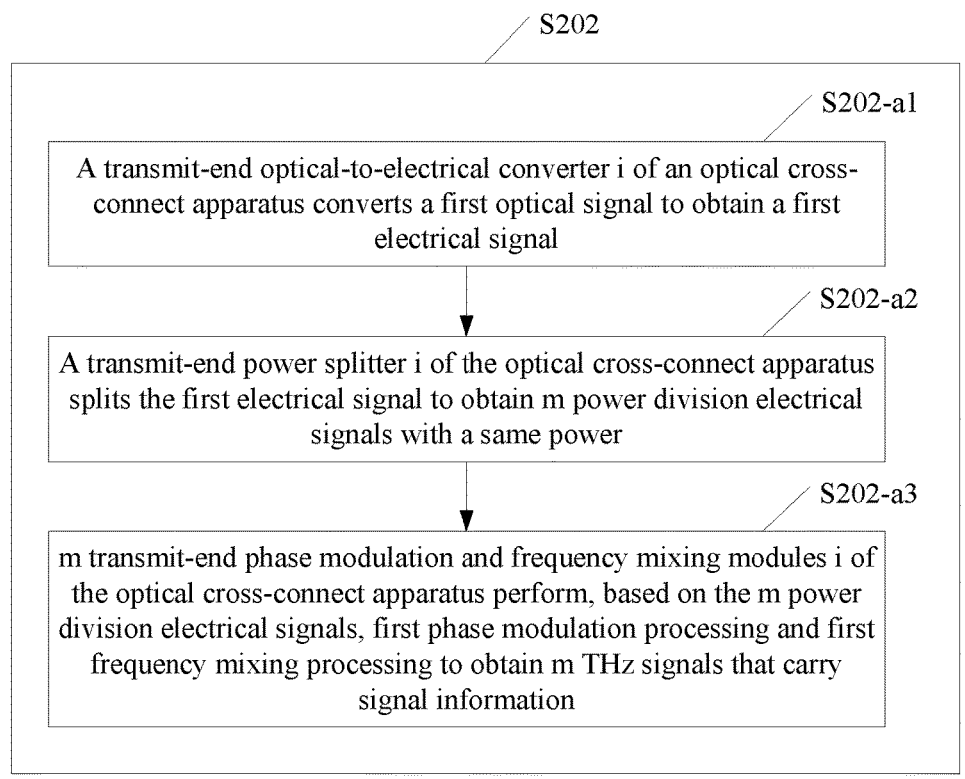
FIG. 4.1

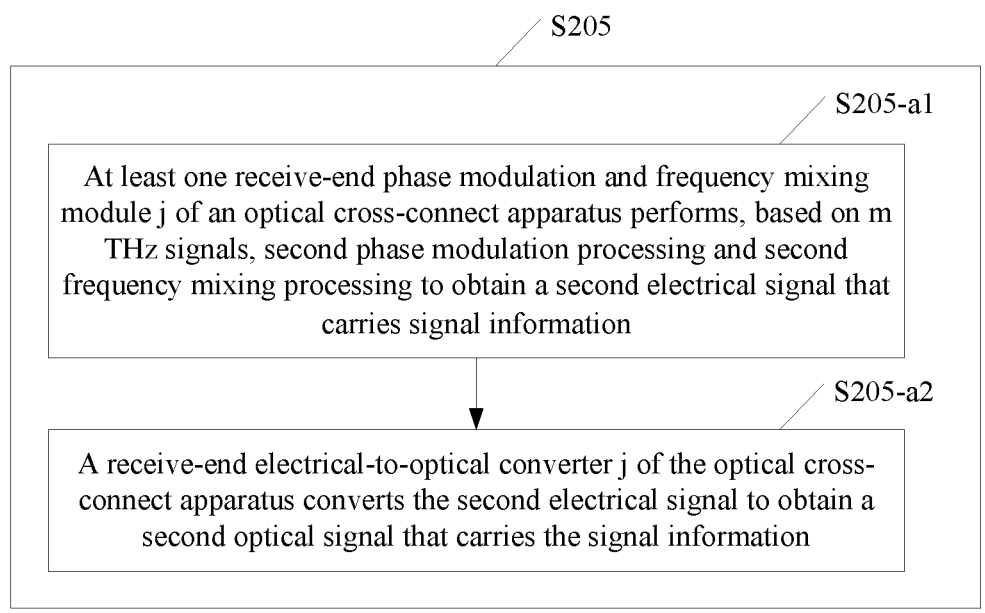
FIG. 4.2

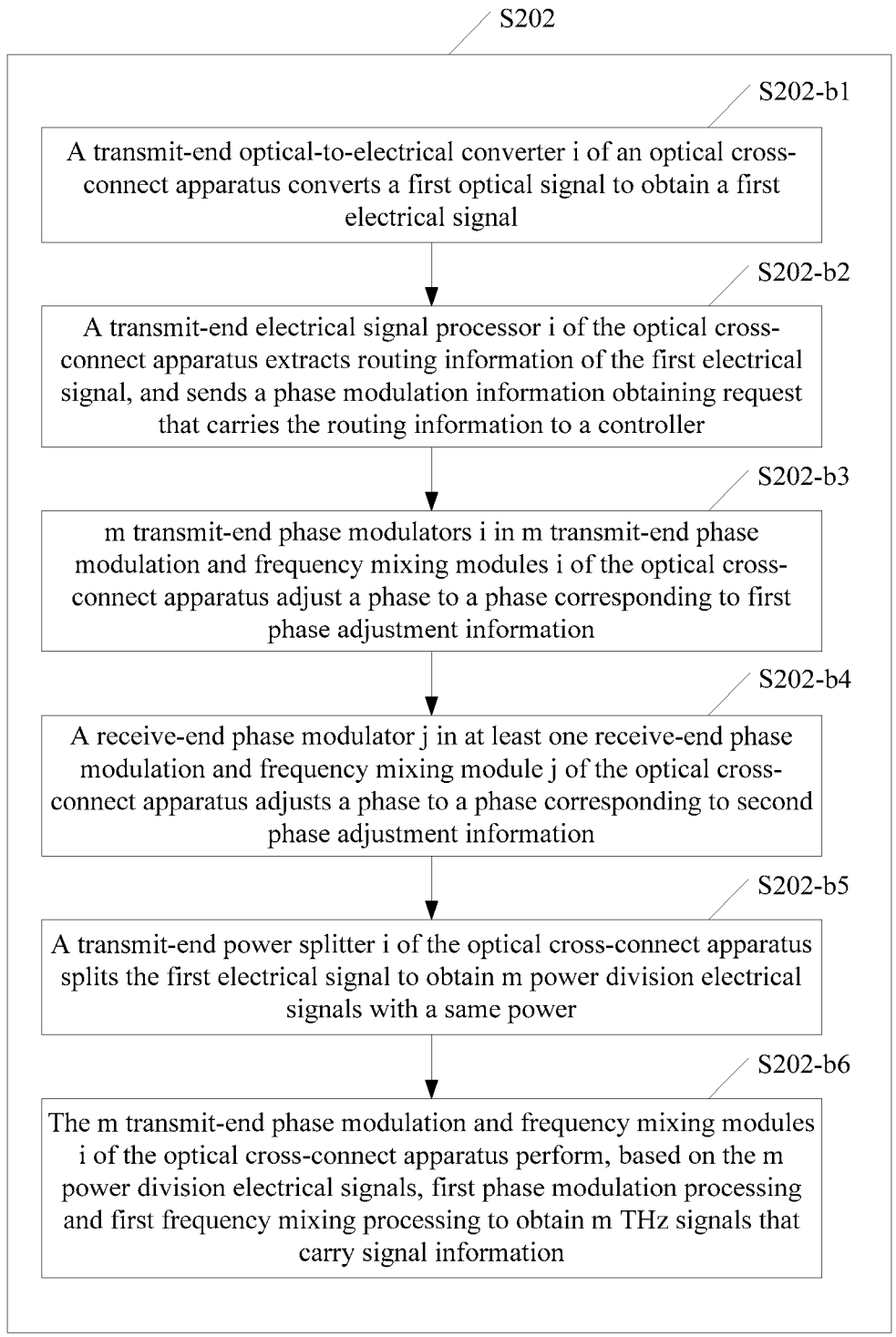
FIG. 6.1

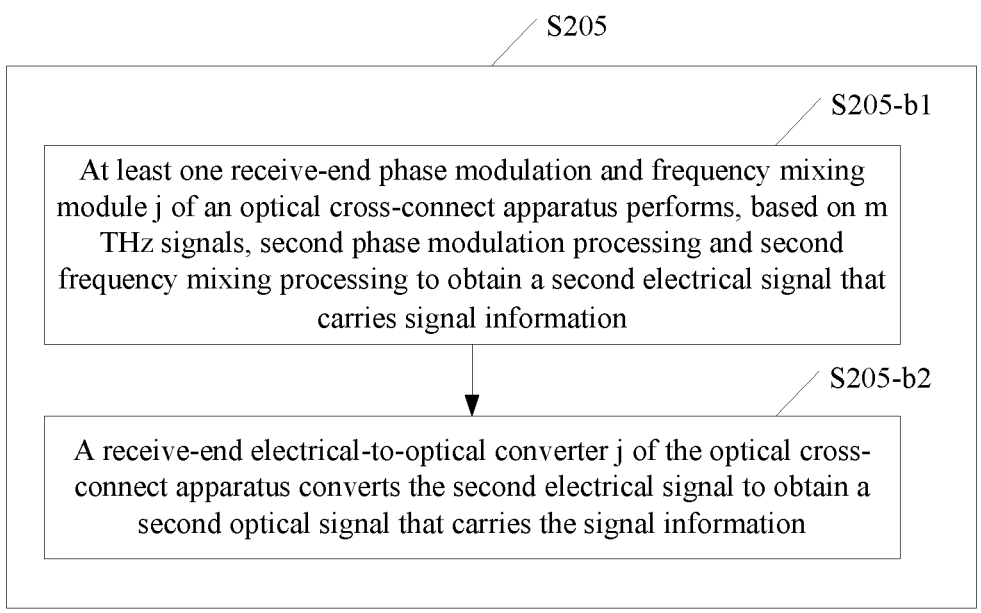
FIG. 6.2

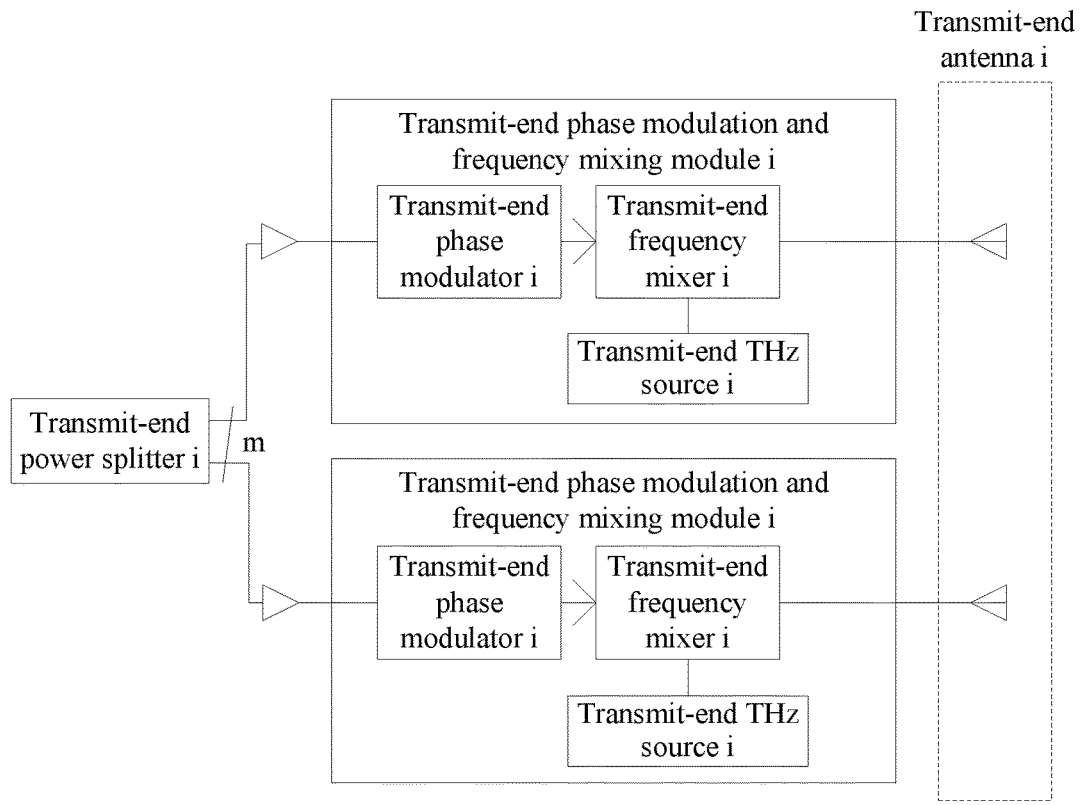
FIG. 7.1
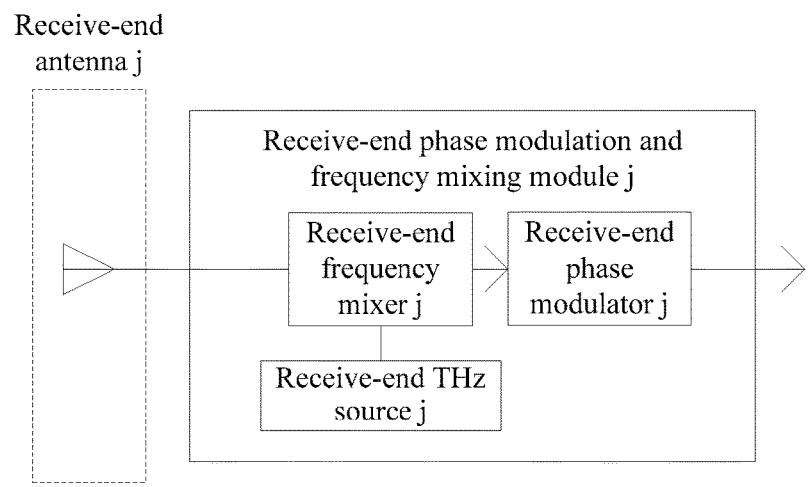
FIG. 7.2

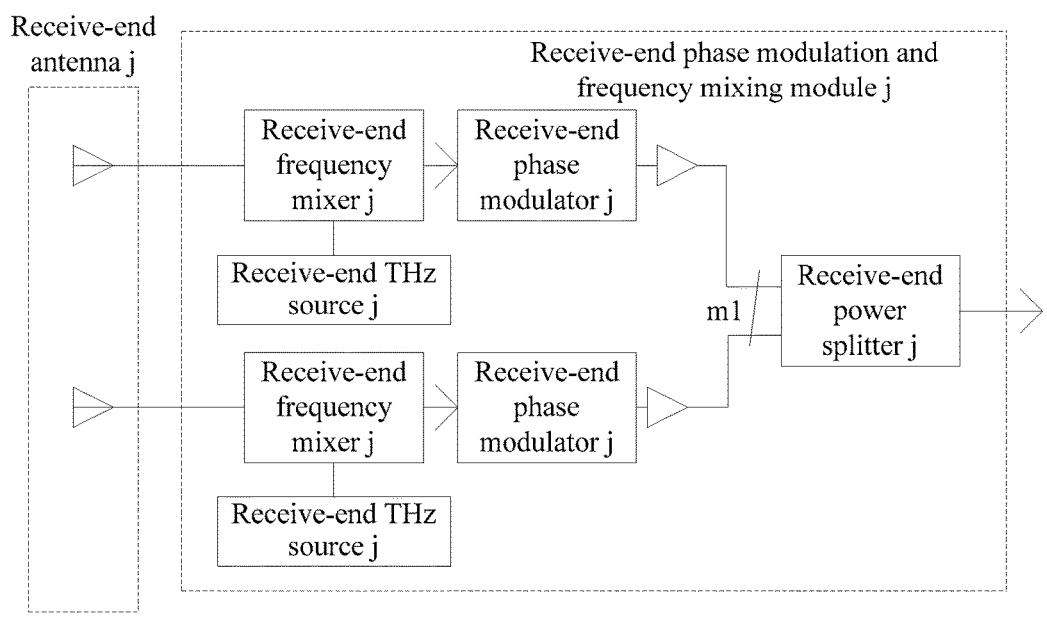
FIG. 7.3

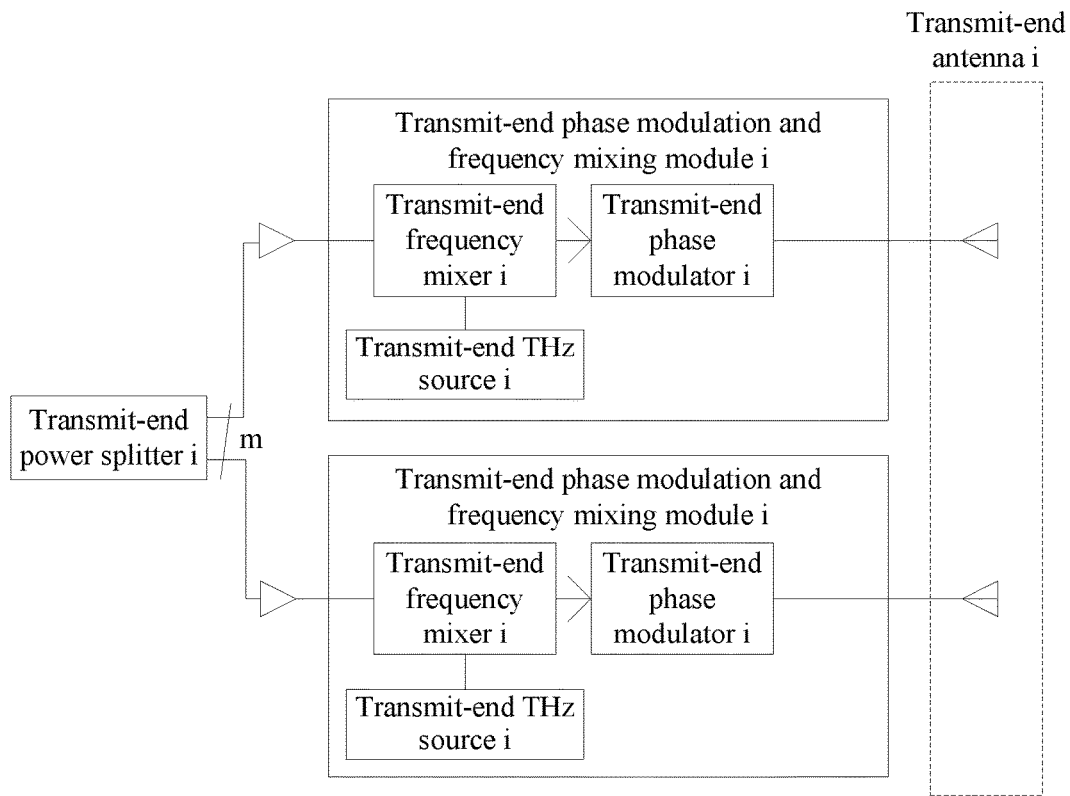
FIG. 7.4
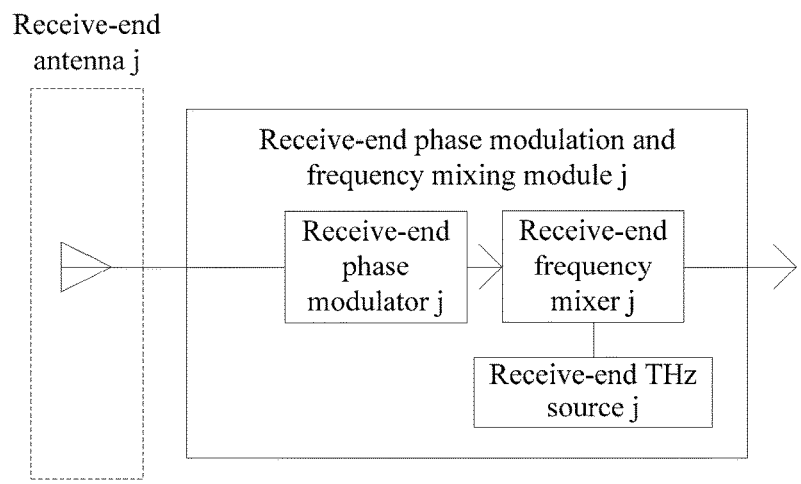
FIG. 7.5

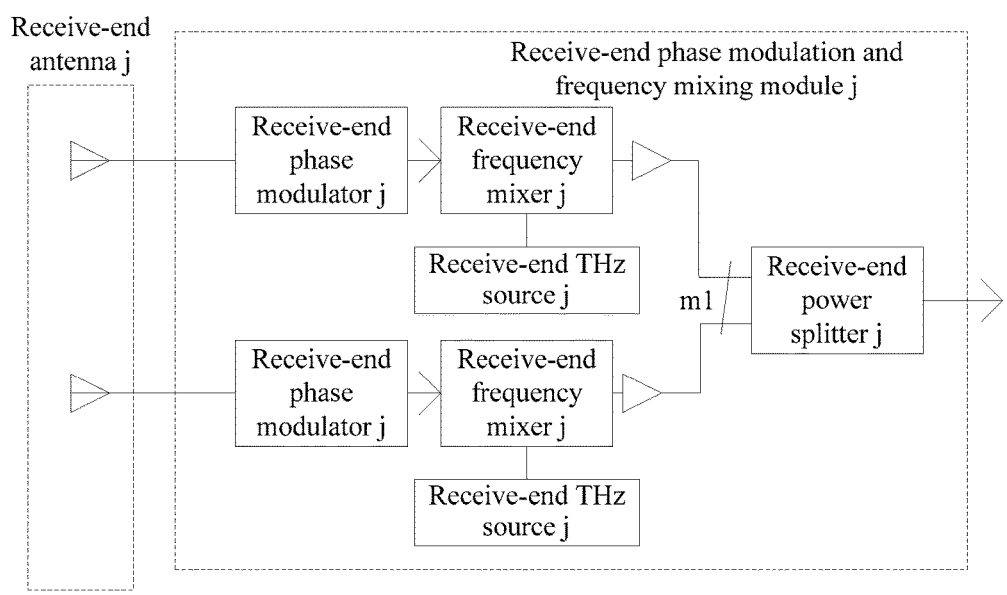
FIG. 7.6

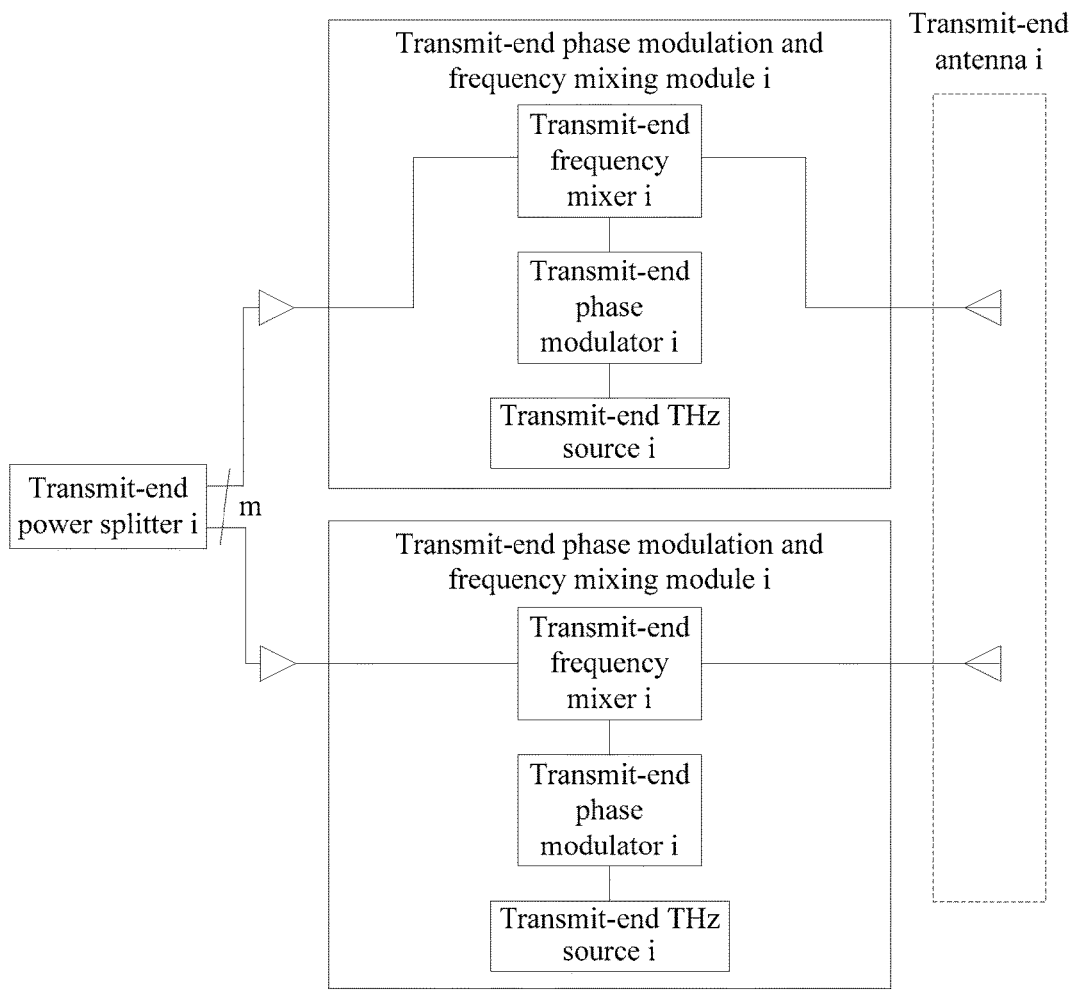
FIG. 7.7

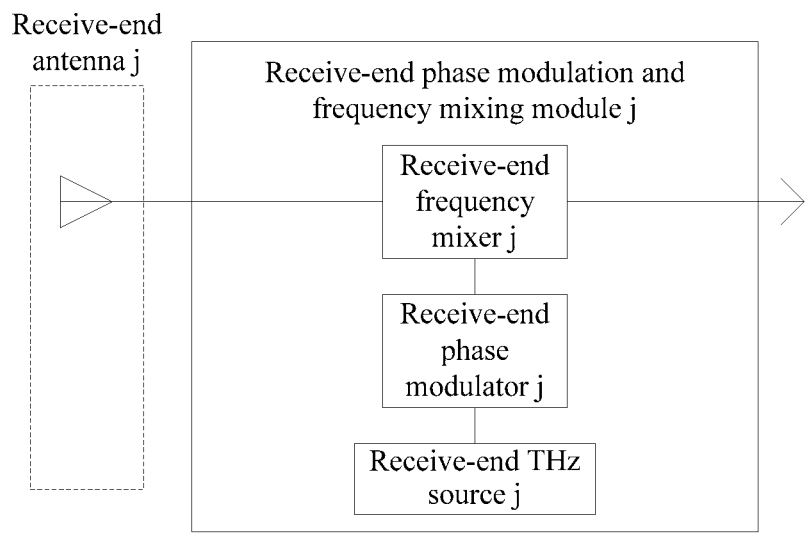
FIG. 7.8

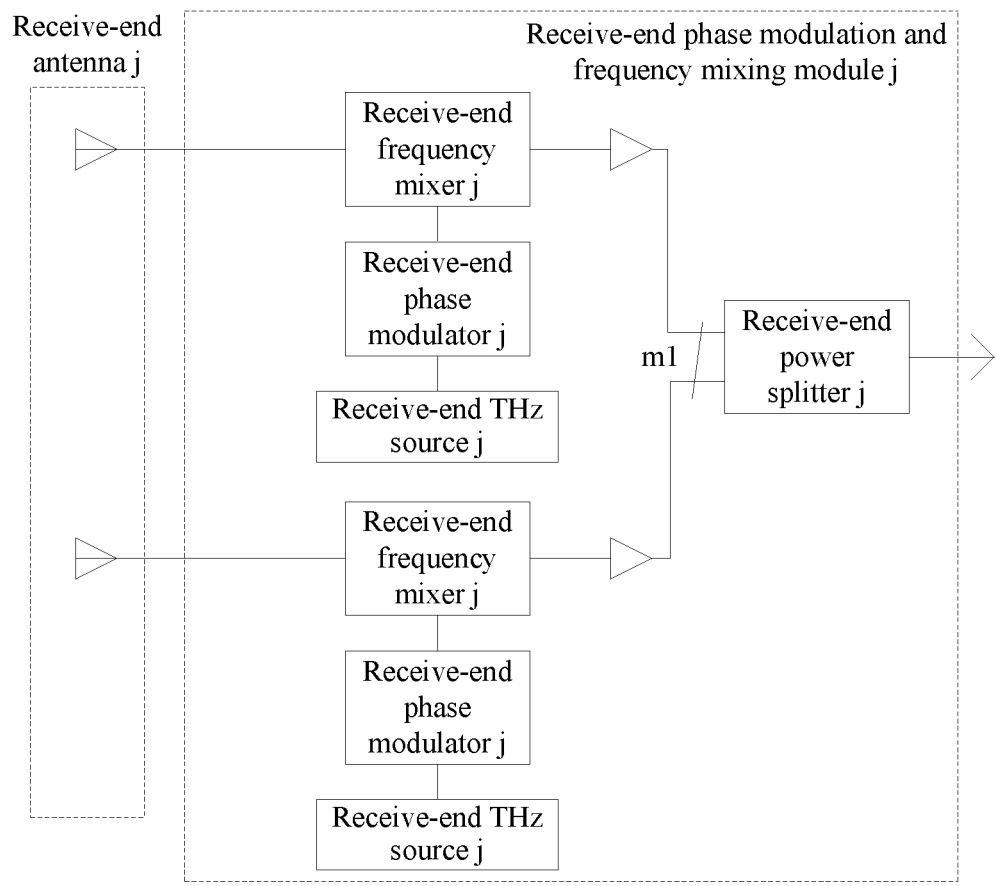
FIG. 7.9

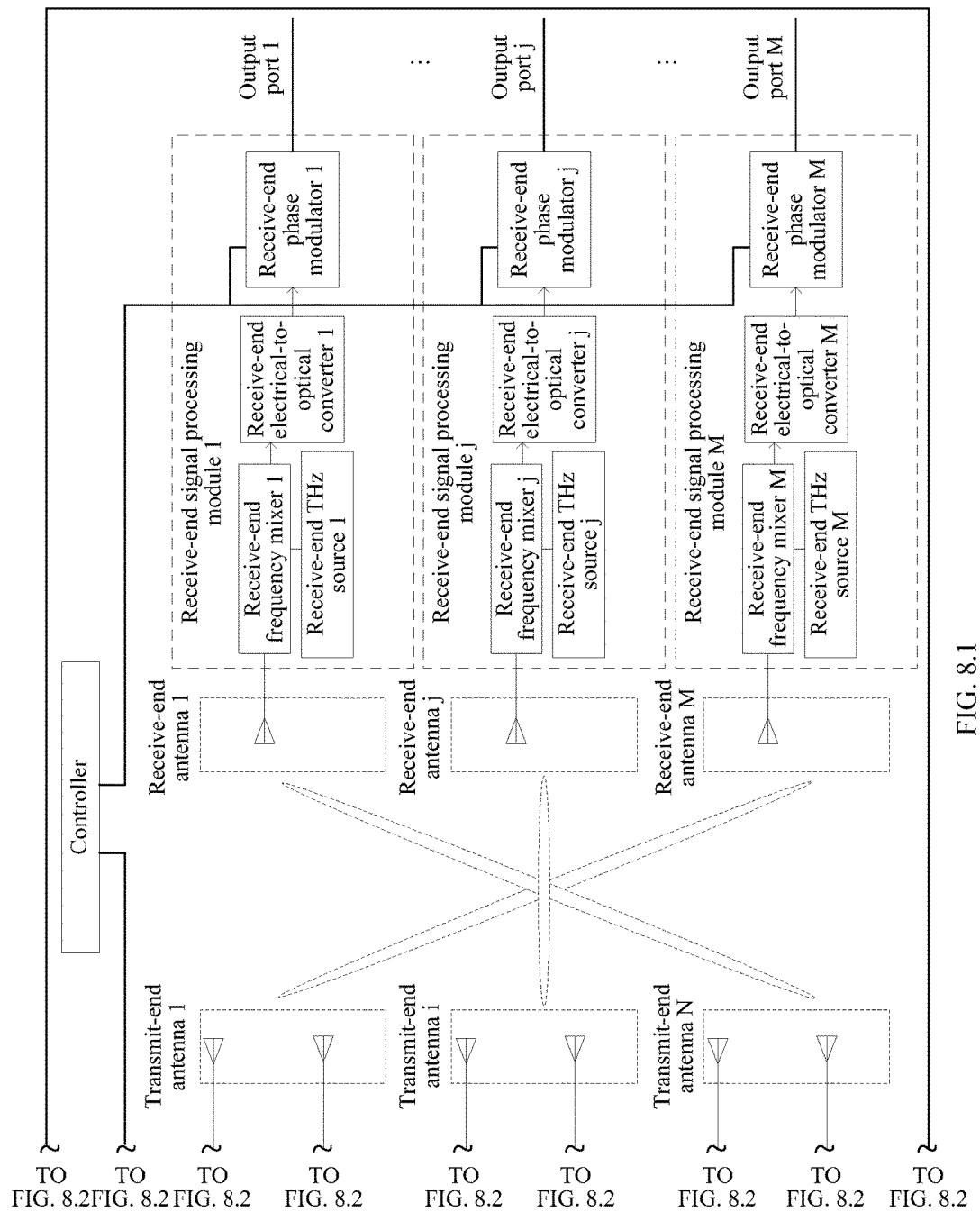
FIG. 8.1

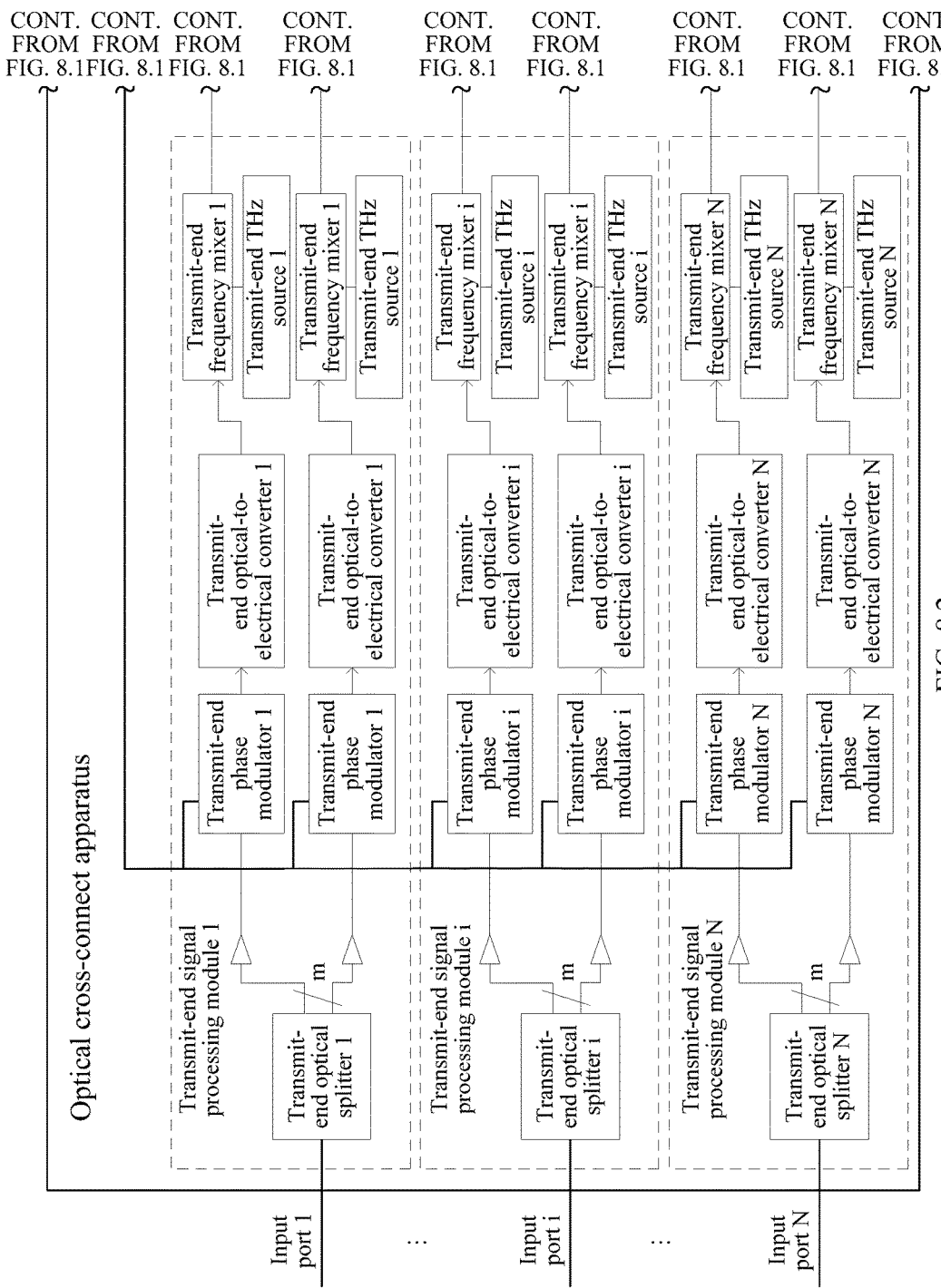
FIG. 8.2

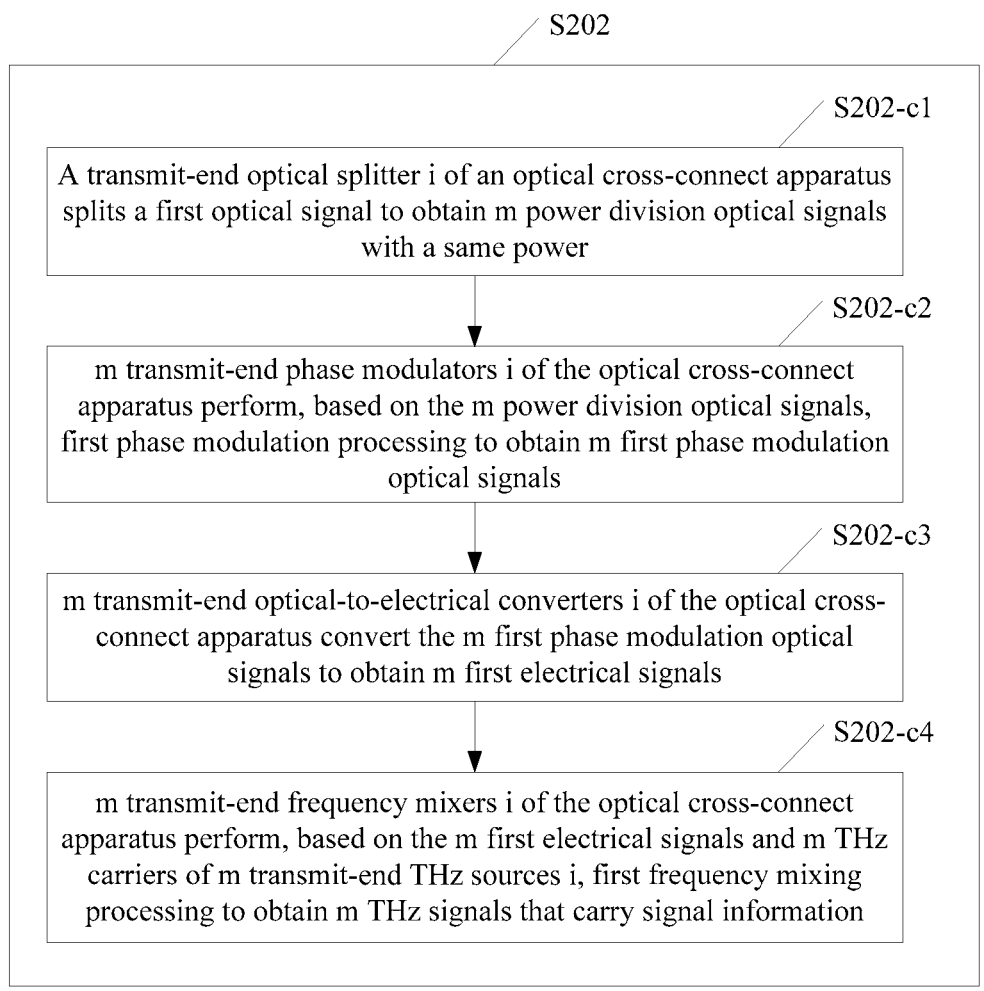
FIG. 9.1

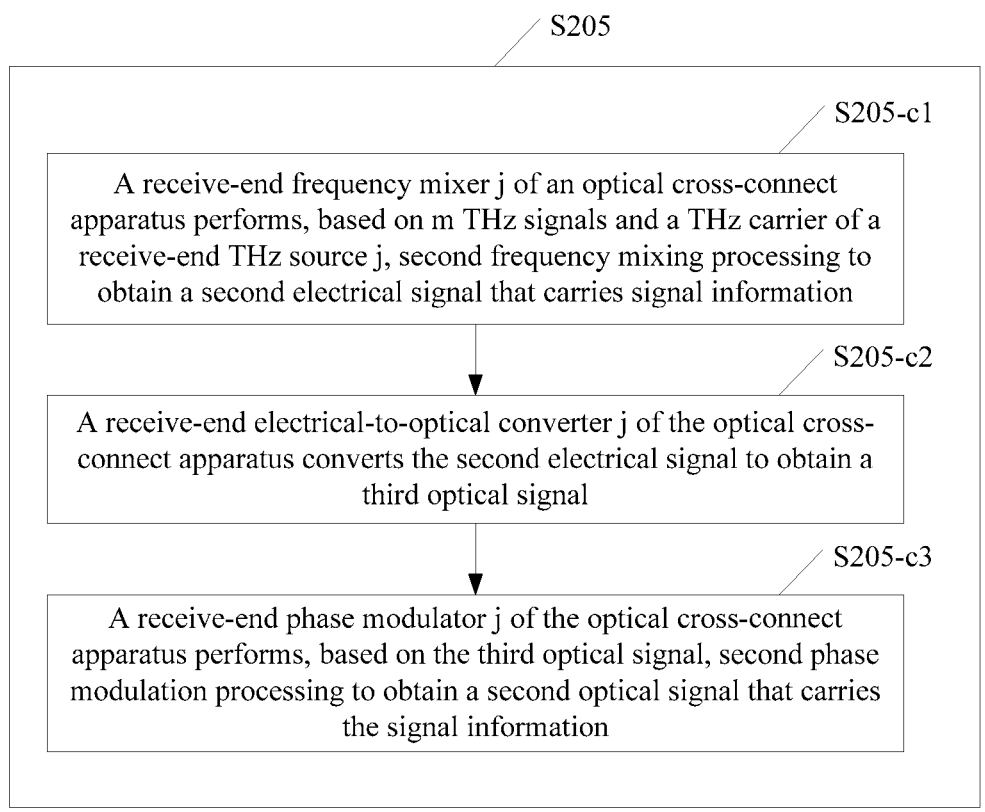
FIG. 9.2

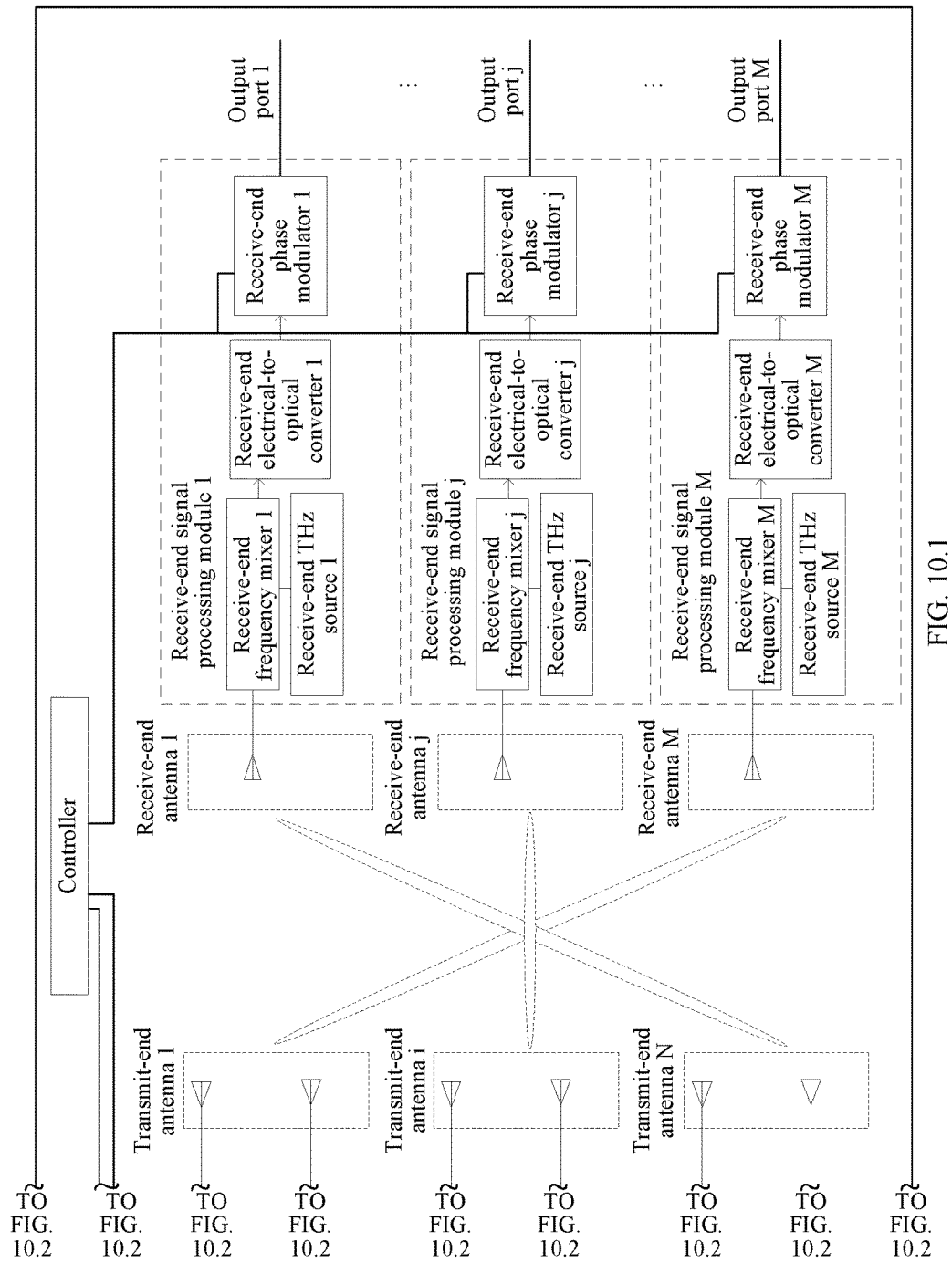
FIG. 10.1

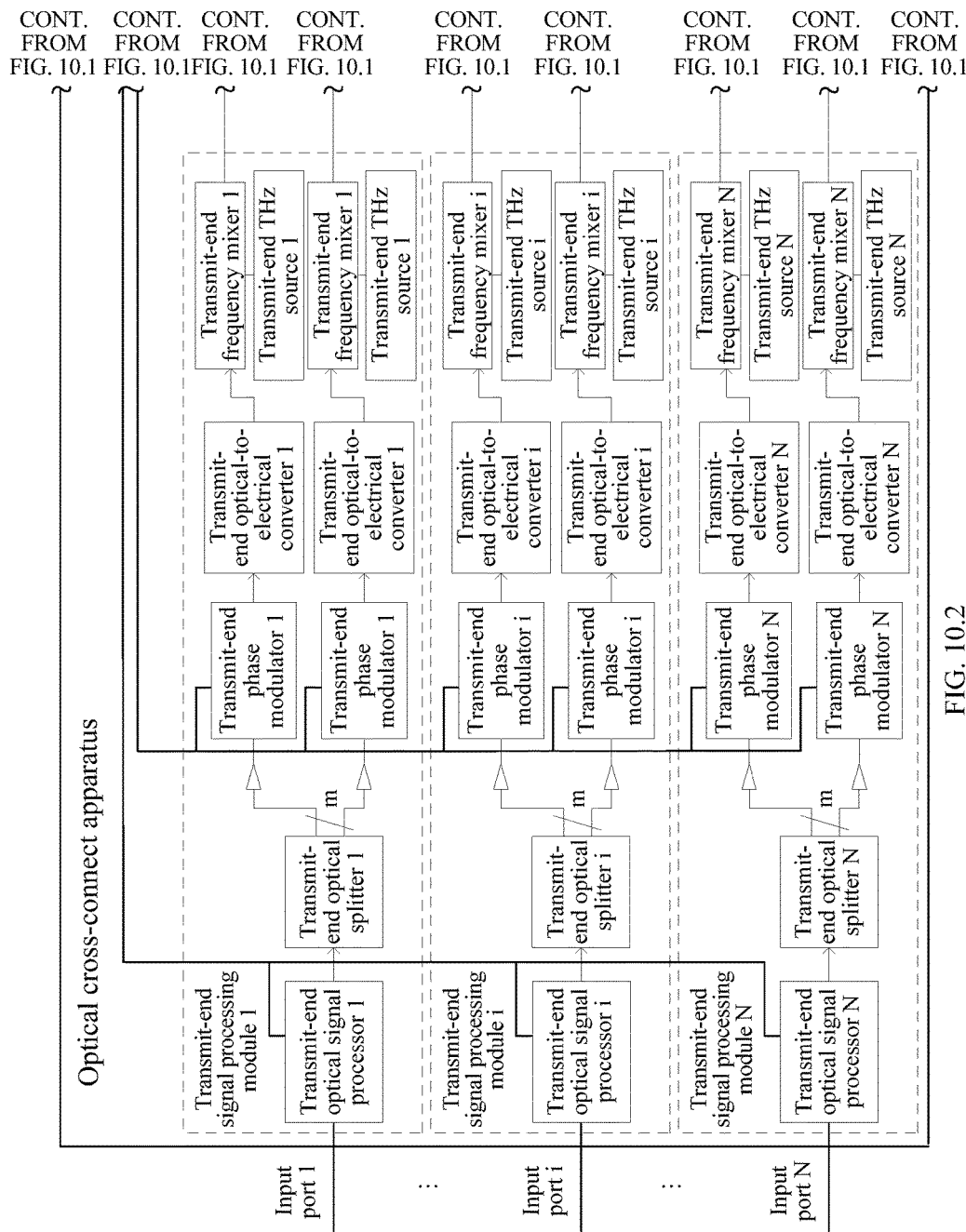
FIG. 10.2

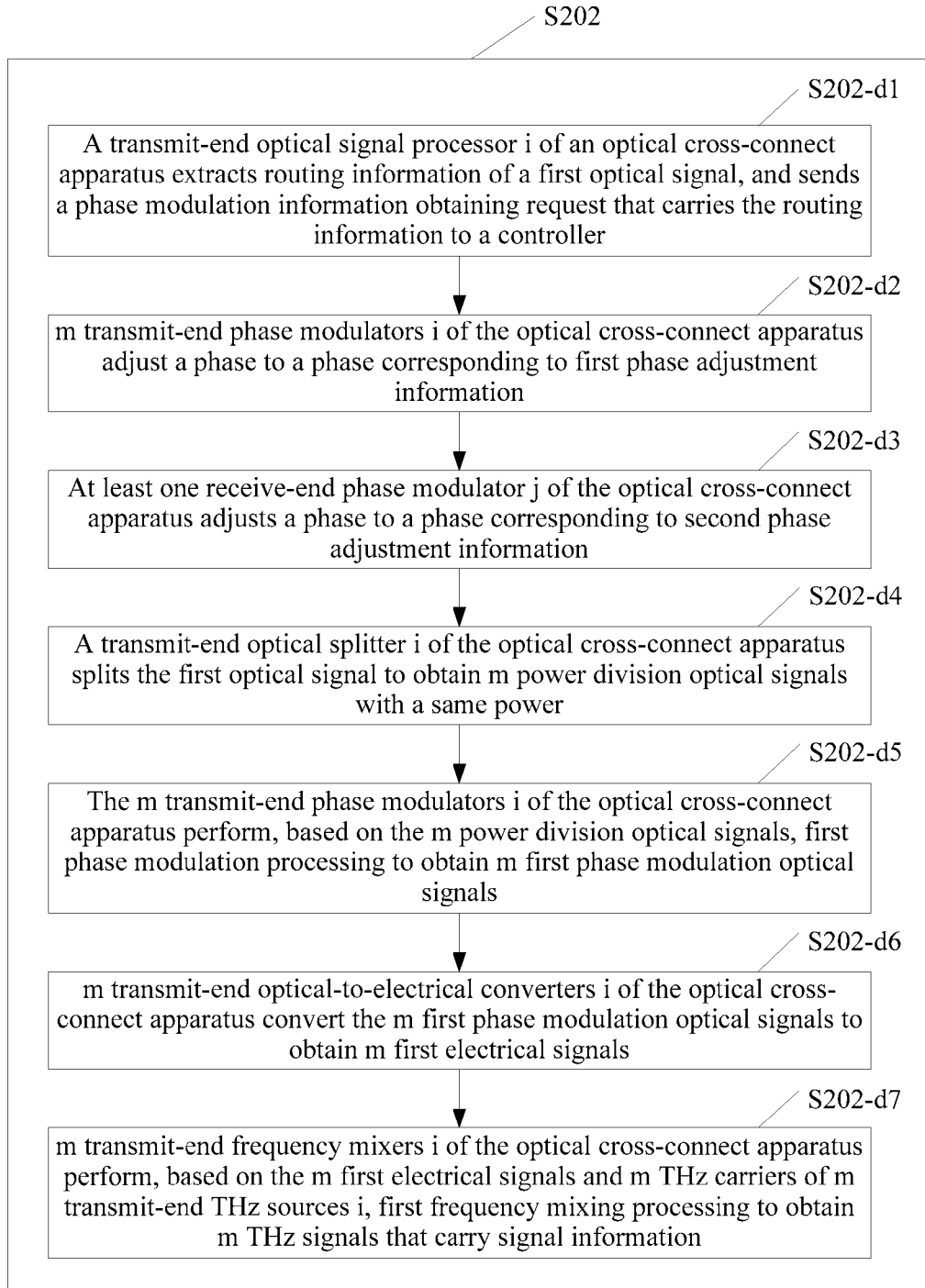
FIG. 11.1

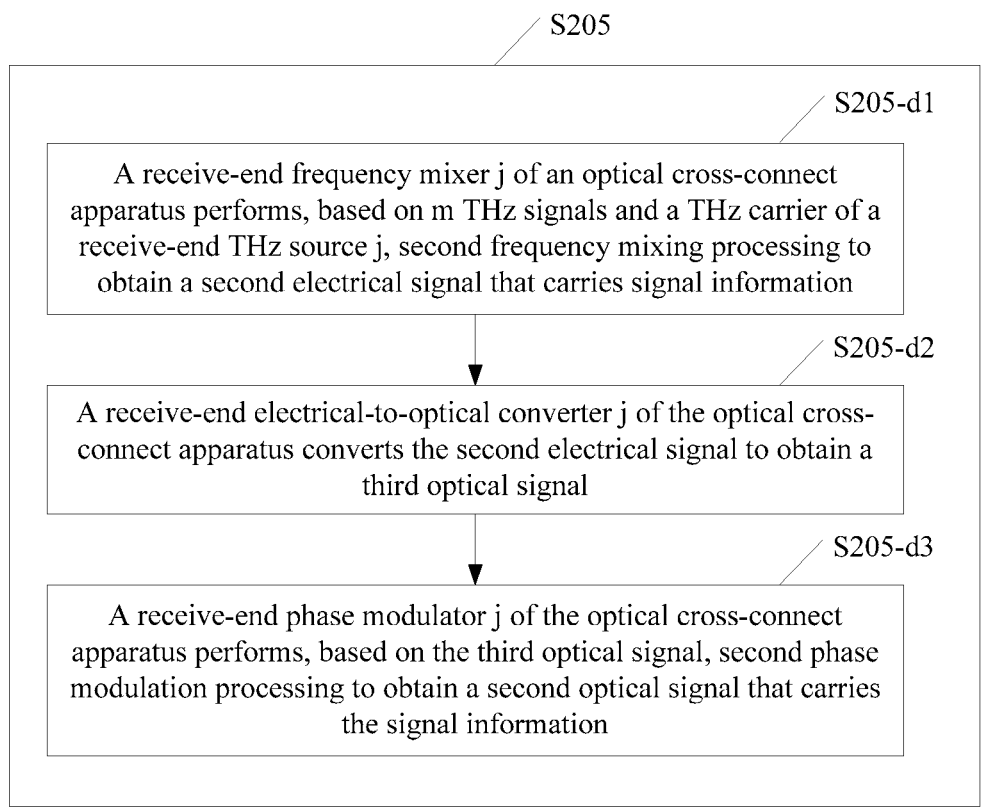
FIG. 11.2

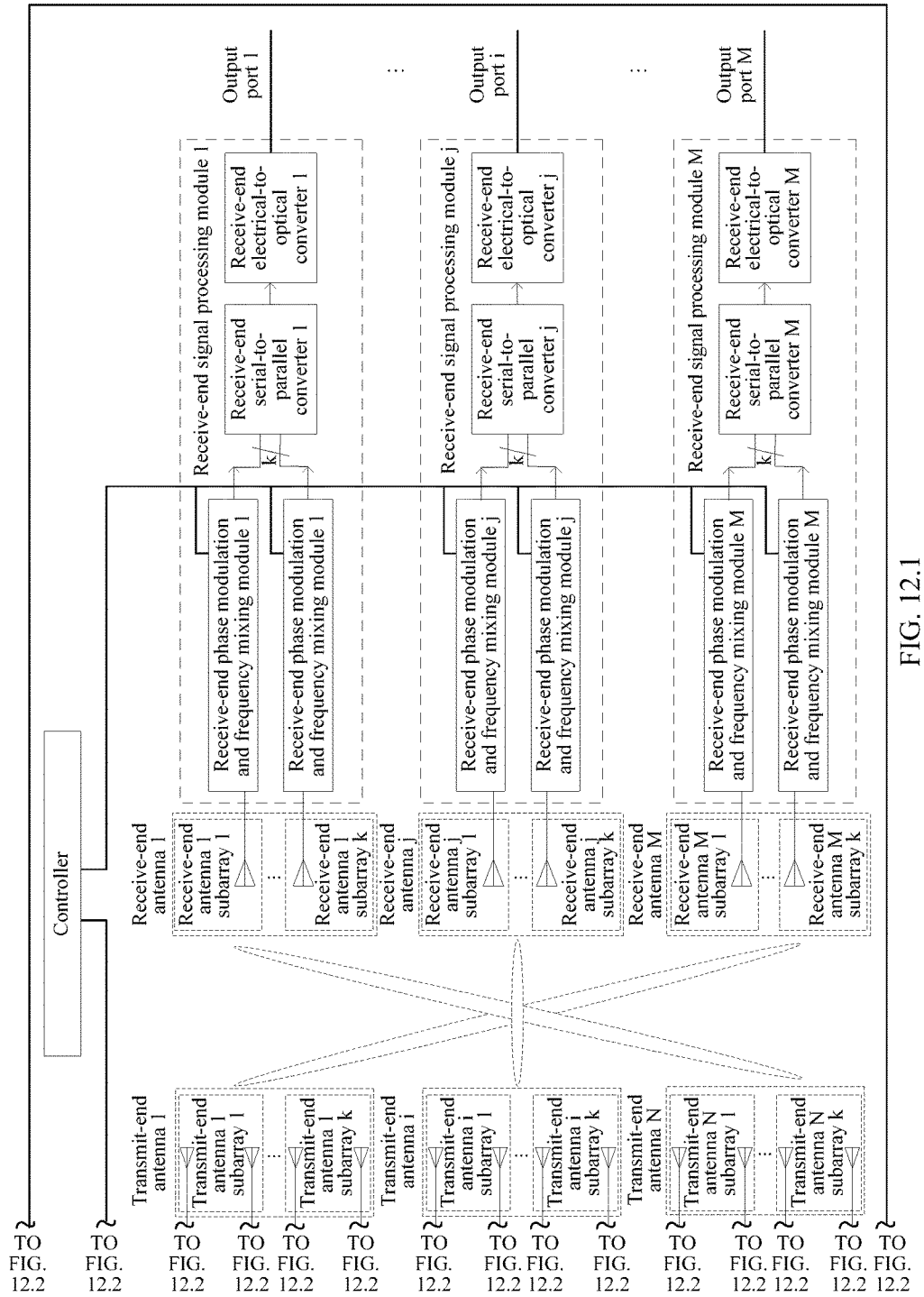
FIG. 12.1

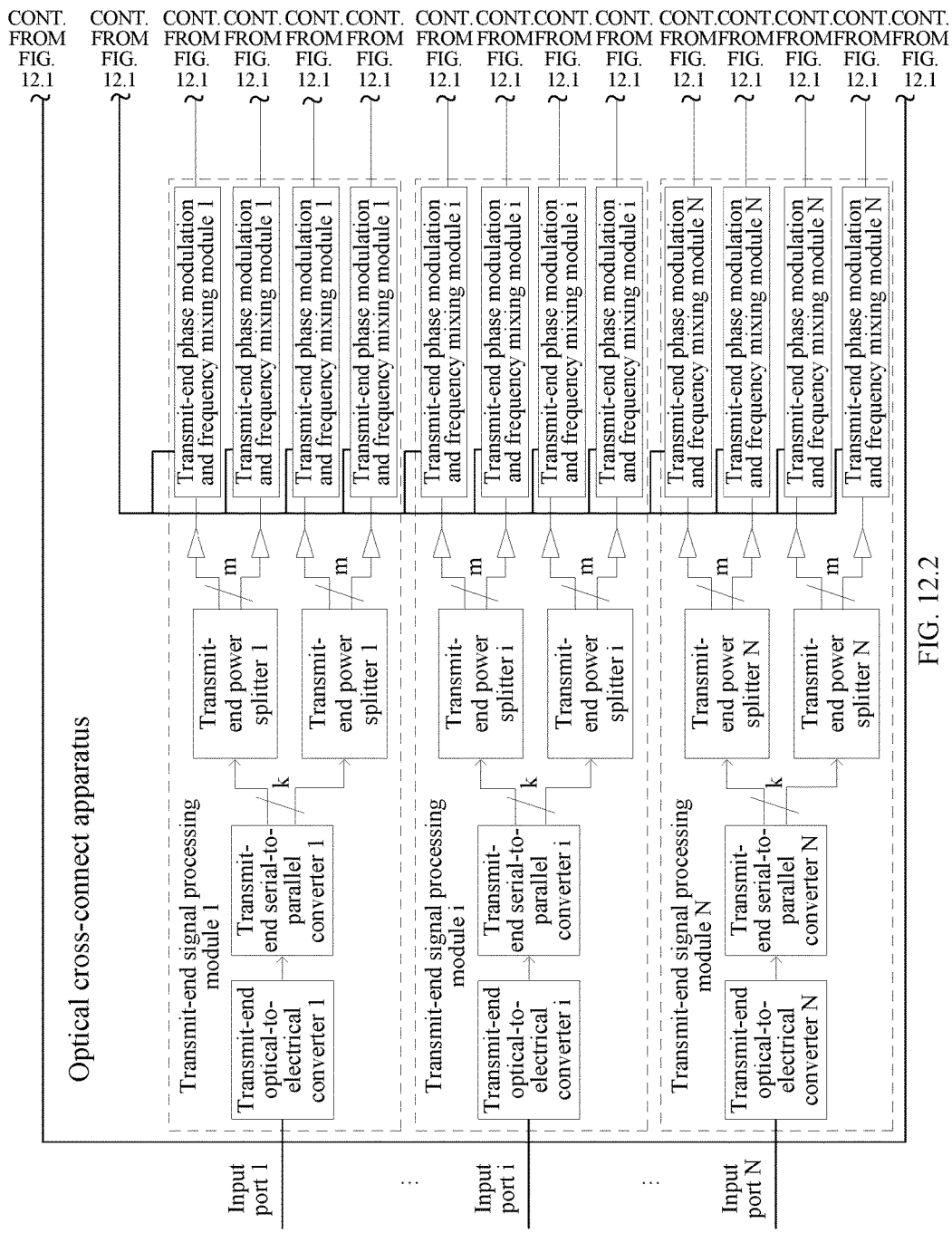
FIG. 12.2

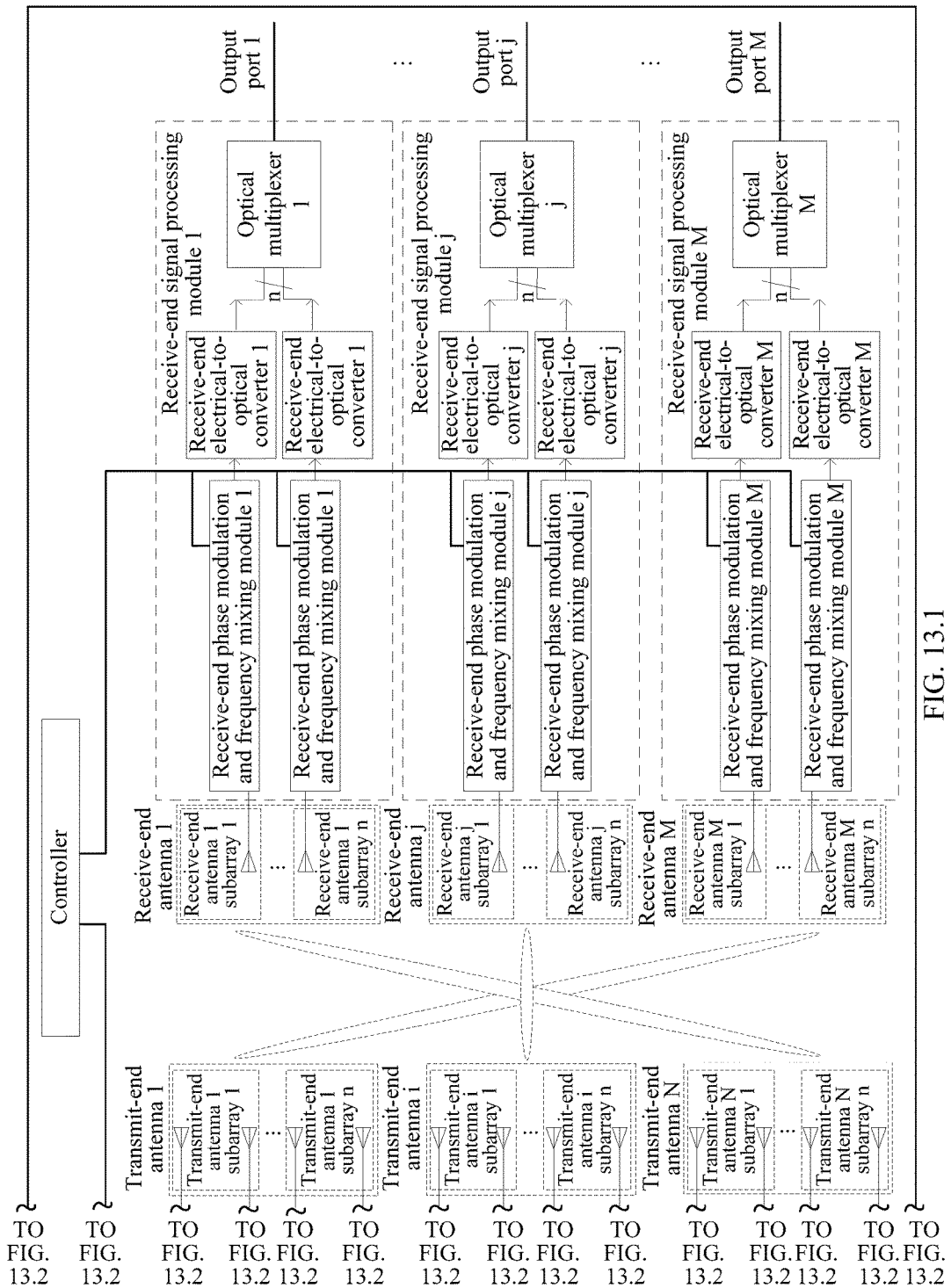
FIG. 13.1

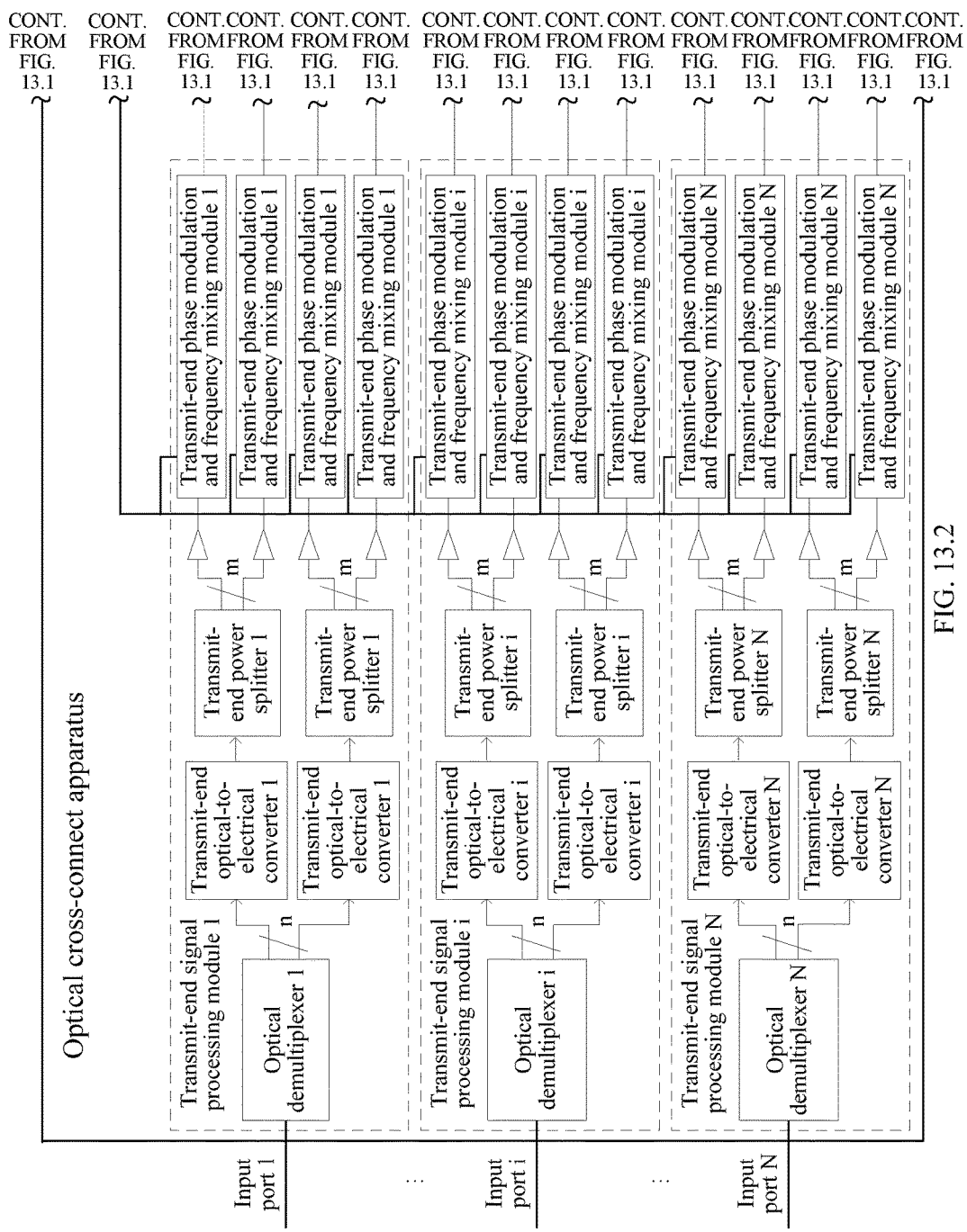
FIG. 13.2

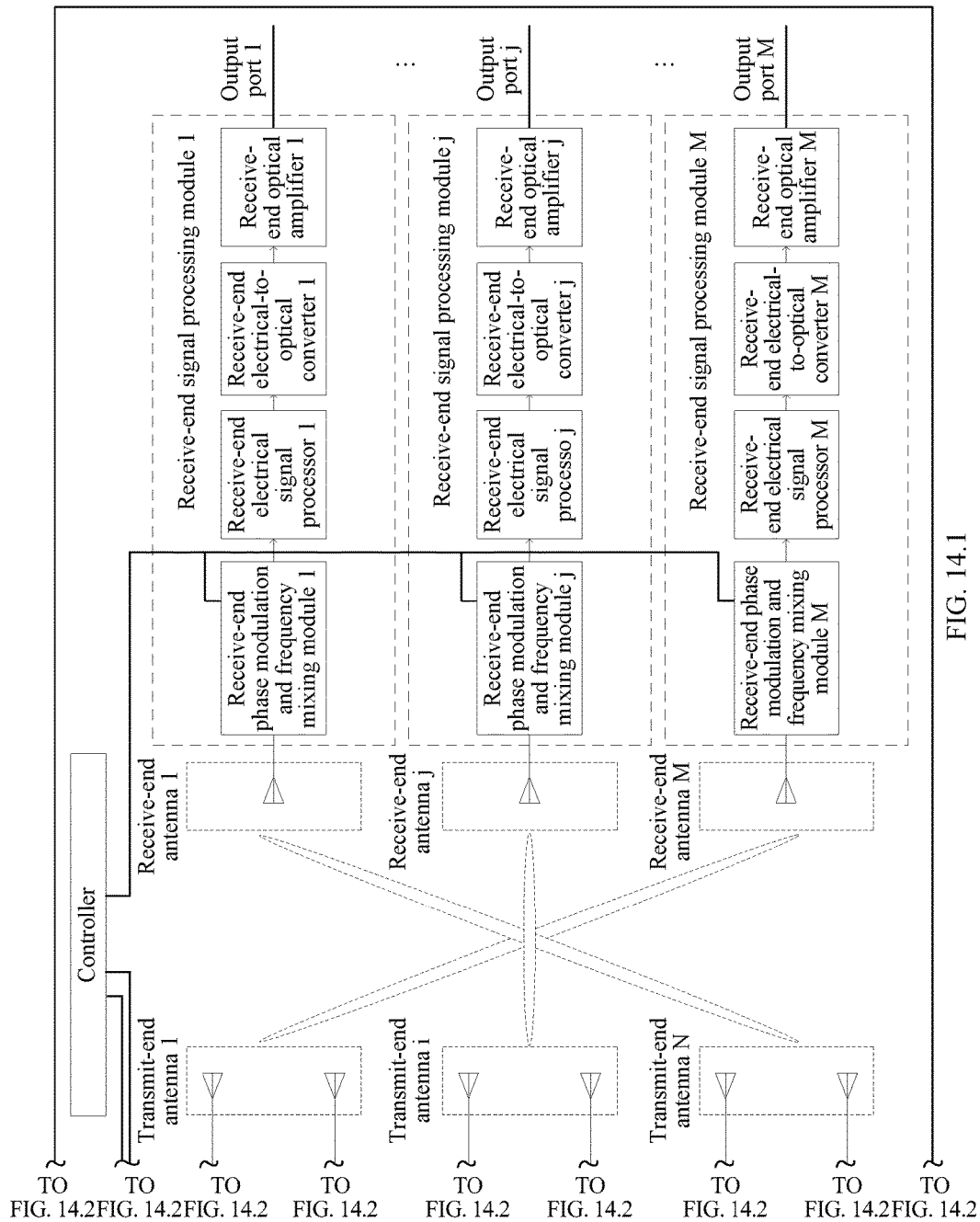
FIG. 14.1

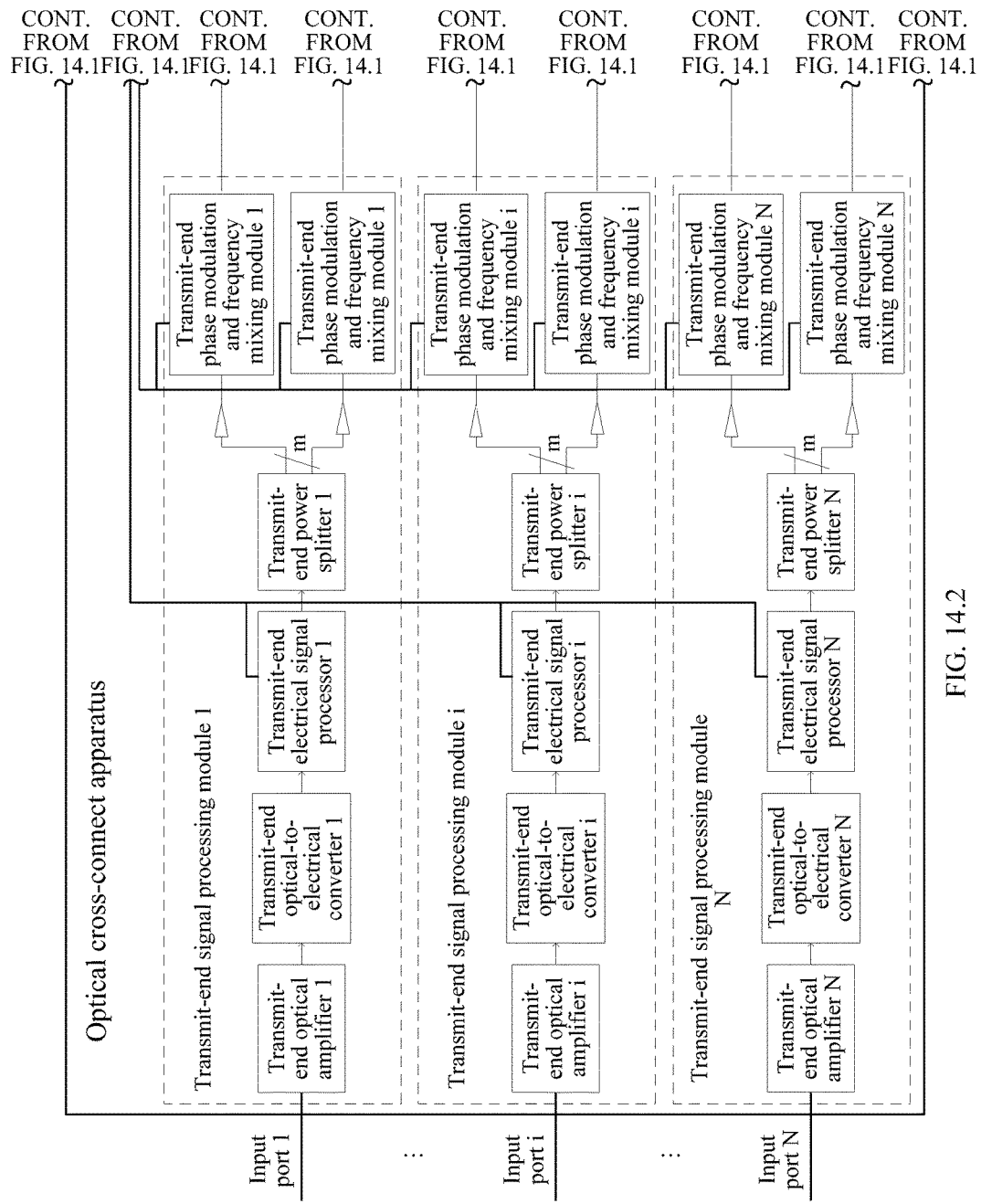
FIG. 14.2

US 10,405,074 B2

OPTICAL SIGNAL PROCESSING METHOD AND OPTICAL CROSS-CONNECT APPARATUS

CROSS-REFERENCE TO RELATED APPLICATIONS

This application is a continuation of International Application No. PCT/CN2016/106708, filed on Nov. 22, 2016, which claims priority to Chinese Patent Application No. 201510824656.X, field on Nov. 24, 2015. The disclosures of the aforementioned applications are hereby incorporated by reference in their entireties.

TECHNICAL FIELD

The present application relates to the field of optical communications technologies, and specifically, to an optical signal processing method and an optical cross-connect apparatus.

BACKGROUND

Enterprise cloud technologies and consumer video applications bring broad impact on a communications market. As a result, data centers have a strong growth in quantity and continual expansion in new geographic positions. Development of all-optical data centers imposes a stringent requirement on an optical cross-connect apparatus. A scale of an optical cross-connect apparatus must reach at least 100×100 to adapt to access of massive servers. A switching time of the optical cross-connect apparatus must reach up to about 10 μs to 100 μs to satisfy application of packet switching. An insertion loss of the optical cross-connect apparatus must be less than at least 5 dB for deployment in many application scenarios.

At present, optical cross-connect apparatus technologies mainly include a 3-dimensional micro-electro-mechanical system (3D-MEMS) optical cross-connect apparatus, a silicon-based optical cross-connect apparatus, and the like. On one hand, at present, a scale of a 3D-MEMS optical cross-connect apparatus for commercial use may reach up to 320×320, and theoretically may have up to thousands of ports. In addition, the 3D-MEMS optical cross-connect apparatus has superior optical performance. However, the optical cross-connect apparatus has an extremely low switching speed only at a millisecond granularity. This restricts application of the 3D-MEMS optical cross-connect apparatus in a data center. On the other hand, the silicon-based optical cross-connect apparatus has a quite high switching speed. With a carrier injection technique, the silicon-based optical cross-connect apparatus may reach a switching speed at a nanosecond granularity. However, currently, the silicon-based optical cross-connect apparatus has a quite large insertion loss and has a polarization-dependent problem. In addition, a scale of the silicon-based optical cross-connect apparatus is difficult to expand. This also restricts application of the silicon-based optical cross-connect apparatus.

SUMMARY

Embodiments of the present disclosure provide an optical signal processing method and an optical cross-connect apparatus, so as to increase a switching speed of the optical cross-connect apparatus, reduce apparatus costs, and increase an integration degree and an expansion scale of the apparatus.

A first aspect of the embodiments of the present disclosure discloses an optical signal processing method, including:

receiving, by an input port i of an optical cross-connect apparatus, a first optical signal, where the input port i is connected to a transmit-end signal processing module i of the optical cross-connect apparatus, the transmit-end signal processing module i is connected to a transmit-end antenna i and a controller of the optical cross-connect apparatus, an output port j of the optical cross-connect apparatus is connected to a receive-end signal processing module j of the optical cross-connect apparatus, the receive-end signal processing module j is connected to a receive-end antenna j and the controller of the optical cross-connect apparatus, N input ports of the optical cross-connect apparatus include the input port i, M output ports of the optical cross-connect apparatus include the output port j, and N and M are positive integers;

performing, based on the first optical signal by the transmit-end signal processing module i of the optical cross-connect apparatus, first phase modulation processing and first frequency mixing processing to obtain a terahertz (THz) signal that carries signal information of the first optical signal, where phase adjustment information used during first phase modulation processing includes first phase adjustment information that matches routing information and that is from the controller, and the routing information includes port information of the input port i and the output port j;

transmitting, by the transmit-end antenna i of the optical cross-connect apparatus, the THz signal;

receiving, by the receive-end antenna j of the optical cross-connect apparatus, the THz signal;

performing, based on the THz signal by the receive-end signal processing module j of the optical cross-connect apparatus, second phase modulation processing and second frequency mixing processing to obtain a second optical signal that carries the signal information, where phase adjustment information used during second phase modulation processing includes second phase adjustment information that matches the routing information and that is from the controller; and outputting, by the output port j of the optical cross-connect apparatus, the second optical signal.

In the embodiments of the present disclosure, first, the input port i of the optical cross-connect apparatus receives the first optical signal. Next, the transmit-end signal processing module i of the optical cross-connect apparatus performs, based on the first optical signal, first phase modulation processing and first frequency mixing processing to obtain the THz signal that carries the signal information of the first optical signal. Then, the transmit-end antenna i corresponding to the input port i of the optical cross-connect apparatus directionally transmits, based on a beamforming technology, the THz signal to the receive-end antenna j corresponding to the output port j, and the receive-end antenna j receives the THz signal. After that, the receive-end signal processing module j of the optical cross-connect apparatus performs, based on the THz signal, second phase modulation processing and second frequency mixing processing to obtain the second optical signal that carries the signal information. Finally, the output port j of the optical cross-connect apparatus outputs the second optical signal. The phase adjustment information used during first phase modulation processing includes the first phase adjustment information that matches the routing information and that is from the controller, and the phase adjustment information used during second phase modulation processing includes the second phase adjustment information that matches the routing information and that is from the controller. Therefore, it can be learnt that the optical cross-connect apparatus can adjust, based on the phase adjustment information, a phase at a transmit end and a phase at a receive end, and quickly implement, based on the beamforming technology, directional switching of a signal transmission link by using the transmit-end antenna i and the receive-end antenna j. This helps increase a switching speed of the optical cross-connect apparatus. In addition, THz-related components of the optical cross-connect apparatus can be integrated by using a complementary metal-oxide-semiconductor (CMOS). This helps reduce apparatus costs, and increase an integration degree and an expansion scale of the apparatus.

In a first possible implementation of the first aspect of the embodiments of the present disclosure, the transmit-end signal processing module i includes a transmit-end optical-to-electrical converter connected to the input port i, a transmit-end power splitter i connected to the transmit-end optical-to-electrical converter i, and m transmit-end phase modulation and mixing modules i connected to the transmit-end power splitter i; the controller is connected to the m transmit-end phase modulation and mixing modules i; phases of m transmit-end phase modulators i in the m transmit-end phase modulation and mixing modules i include a phase that matches the first phase adjustment information; the transmit-end antenna i includes m transmit-end single antennas i connected to the m transmit-end phase modulation and mixing modules i; and m is an integer greater than 1;

the receive-end signal processing module j includes at least one receive-end phase modulation and mixing module j connected to the receive-end antenna j, and a receive-end electrical-to-optical converter j connected to the receive-end phase modulation and mixing module j; the receive-end electrical-to-optical converter j is connected to the output port j; the controller is connected to the receive-end phase modulation and mixing module j; a phase of a receive-end phase modulator j in the receive-end phase modulation and mixing module j includes a phase that matches the second phase adjustment information; and the receive-end antenna j includes at least one receive-end single antenna j connected to the at least one receive-end phase modulation and mixing module j;

the performing, based on the first optical signal by the transmit-end signal processing module i, first phase modulation processing and first frequency mixing processing to obtain a THz signal that carries signal information of the first optical signal includes:

converting, by the transmit-end optical-to-electrical converter i, the first optical signal to obtain a first electrical signal; splitting, by the transmit-end power splitter i, the first electrical signal to obtain m power division electrical signals with a same power; and performing, based on the m power division electrical signals by the m transmit-end phase modulation and mixing modules i, first phase modulation processing and first frequency mixing processing to obtain m THz signals that carry the signal information; and the performing, based on the THz signal by the receive-end signal processing module j, second phase modulation processing and second frequency mixing processing to obtain a second optical signal that carries the signal information includes:

performing, based on the m THz signals by the at least one receive-end phase modulation and mixing module j, second phase modulation processing and second frequency mixing processing to obtain a second electrical signal that carries the signal information; and converting, by the receive-end electrical-to-optical converter j, the second electrical signal to obtain the second optical signal that carries the signal information.

In a second possible implementation of the first aspect of the embodiments of the present disclosure, the transmit-end signal processing module i includes a transmit-end optical-to-electrical converter connected to the input port i, a transmit-end electrical signal processor i connected to the transmit-end optical-to-electrical converter i, a transmit-end power splitter i connected to the transmit-end electrical signal processor i, and m transmit-end phase modulation and mixing modules i connected to the transmit-end power splitter i; the transmit-end electrical signal processor i is connected to the controller; the controller is connected to the m transmit-end phase modulation and mixing modules i; the transmit-end antenna i includes m transmit-end single antennas i connected to the m transmit-end phase modulation and mixing modules i; and m is an integer greater than 1;

the receive-end signal processing module j includes at least one receive-end phase modulation and mixing module j connected to the receive-end antenna j, and a receive-end electrical-to-optical converter j connected to the receive-end phase modulation and mixing module j; the receive-end electrical-to-optical converter j is connected to the output port j; the controller is connected to the receive-end phase modulation and mixing module j; and the receive-end antenna j includes at least one receive-end single antenna j connected to the at least one receive-end phase modulation and mixing module j;

the performing, based on the first optical signal by the transmit-end signal processing module i, first phase modulation processing and first frequency mixing processing to obtain a terahertz (THz) signal that carries signal information of the first optical signal includes:

converting, by the transmit-end optical-to-electrical converter i, the first optical signal to obtain a first electrical signal; extracting, by the transmit-end electrical signal processor i, the routing information of the first electrical signal, sending a phase modulation information obtaining request that carries the routing information to the controller, sending the first phase adjustment information to the m transmit-end phase modulation and mixing modules i, and sending the second phase adjustment information to the at least one receive-end phase modulation and mixing module j, where the phase modulation information obtaining request is used to instruct the controller to query a prestored routing table to obtain the first phase adjustment information and the second phase adjustment information that match the routing information; adjusting, by m transmit-end phase modulators in the m transmit-end phase modulation and mixing modules i, a phase to a phase corresponding to the first phase adjustment information; and adjusting, by a receive-end phase modulator j in the at least one receive-end phase modulation and mixing module j, a phase to a phase corresponding to the second phase adjustment information; splitting, by the transmit-end power splitter the first electrical signal to obtain m power division electrical signals with a same power; and performing, based on the m power division electrical signals by the m transmit-end phase modulation and mixing modules i, first phase modulation processing and first frequency mixing processing to obtain m THz signals that carry the signal information;

the performing, based on the THz signal by the receive-end signal processing module j, second phase modulation processing and second frequency mixing processing to obtain a second optical signal that carries the signal information includes:

performing, based on the m THz signals by the at least one receive-end phase modulation and mixing module j, second phase modulation processing and second frequency mixing processing to obtain a second electrical signal that carries the signal information; and converting, by the receive-end electrical-to-optical converter j, the second electrical signal to obtain the second optical signal that carries the signal information.

In a third possible implementation of the first aspect of the embodiments of the present disclosure, the transmit-end signal processing module i includes a transmit-end optical splitter i connected to the input port i, m transmit-end phase modulators i connected to the transmit-end optical splitter i, m transmit-end optical-to-electrical converters connected to the m transmit-end phase modulators i, m transmit-end frequency mixers i connected to the m transmit-end optical-to-electrical converters i, and m transmit-end THz sources i connected to the m transmit-end frequency mixers i; the controller is connected to the m transmit-end phase modulators i; phases of the m transmit-end phase modulators i include a phase that matches the first phase adjustment information; the transmit-end antenna i includes m transmit-end single antennas i connected to the m transmit-end frequency mixers i; and m is an integer greater than 1;

the receive-end signal processing module j includes at least one receive-end frequency mixer j connected to the receive-end antenna j, a receive-end THz source j connected to the receive-end frequency mixer j, a receive-end electrical-to-optical converter j connected to the receive-end frequency mixer j, and a receive-end phase modulator j connected to the receive-end electrical-to-optical converter j; the receive-end phase modulator j is connected to the output port j; and a phase of the receive-end phase modulator j includes a phase that matches the second phase adjustment information;

the performing, based on the first optical signal by the transmit-end signal processing module i, first phase modulation processing and first frequency mixing processing to obtain a THz signal that carries signal information of the first optical signal includes:

splitting, by the transmit-end optical splitter i, the first optical signal to obtain m power division optical signals with a same power; performing, based on the m power division optical signals by the m transmit-end phase modulators i, first phase modulation processing to obtain m first phase modulation optical signals; converting, by the m transmit-end optical-to-electrical converters i, the m first phase modulation optical signals to obtain m first electrical signals; and performing, based on the m first electrical signals and m THz carriers of the m transmit-end THz sources i by the m transmit-end frequency mixers i, first frequency mixing processing to obtain m THz signals that carry the signal information; and the performing, based on the THz signal by the receive-end signal processing module j, second phase modulation processing and second frequency mixing processing to obtain a second optical signal that carries the signal information includes:

performing, based on the m THz signals and a THz carrier of the receive-end THz source j by the receive-end frequency mixer j, second frequency mixing processing to obtain a second electrical signal that carries the signal information; converting, by the receive-end electrical-to-optical converter j, the second electrical signal to obtain a third optical signal; and performing, based on the third optical signal by the receive-end phase modulator j, second phase modulation processing to obtain the second optical signal that carries the signal information.

In a fourth possible implementation of the first aspect of the embodiments of the present disclosure, the transmit-end signal processing module i includes a transmit-end optical signal processor i connected to the input port i, a transmit-end optical splitter i connected to the transmit-end optical signal processor i, m transmit-end phase modulators i connected to the transmit-end optical splitter i, m transmit-end optical-to-electrical converters i connected to the m transmit-end phase modulators i, m transmit-end frequency mixers i connected to the m transmit-end optical-to-electrical converters, and m transmit-end THz sources i connected to the m transmit-end frequency mixers i; the transmit-end optical signal processor i is connected to the controller; the controller is connected to the m transmit-end phase modulators i; and the transmit-end antenna i includes m transmit-end single antennas i connected to the m transmit-end frequency mixers i;

the receive-end signal processing module j includes at least one receive-end frequency mixer j connected to the receive-end antenna j, a receive-end THz source j and a receive-end electrical-to-optical converter j that are connected to the receive-end frequency mixer j, and a receive-end phase modulator j connected to the receive-end electrical-to-optical converter j; the receive-end phase modulator j is connected to the output port j; the controller is connected to the receive-end phase modulator j; and the receive-end antenna j includes at least one receive-end single antenna j connected to the at least one receive-end frequency mixer j;

the performing, based on the first optical signal by the transmit-end signal processing module i, first phase modulation processing and first frequency mixing processing to obtain a terahertz (THz) signal that carries signal information of the first optical signal includes:

extracting, by the transmit-end optical signal processor i, routing information of the first optical signal, sending a phase modulation information obtaining request that carries the routing information to the controller, sending the first phase adjustment information to the m transmit-end phase modulators i, and sending the second phase adjustment information to at least one receive-end phase modulator j corresponding to the at least one receive-end frequency mixer j, where the phase modulation information obtaining request is used to instruct the controller to query a prestored routing table to obtain first phase adjustment information and second phase adjustment information that match the routing information; adjusting, by the m transmit-end phase modulators i, a phase to a phase corresponding to the first phase adjustment information; adjusting, by the at least one receive-end phase modulator j, a phase to a phase corresponding to the second phase adjustment information; splitting, by the transmit-end optical splitter i, the first optical signal to obtain m power division optical signals with a same power; performing, based on the m power division optical signals by the m transmit-end phase modulators i, first phase modulation processing to obtain m first phase modulation optical signals; converting, by the m transmit-end optical-to-electrical converters i, the m first phase modulation optical signals to obtain m first electrical signals; and performing, based on the m first electrical signals and m THz carriers of the m transmit-end THz sources i by the m transmit-end frequency mixers i, first frequency mixing processing to obtain m THz signals that carry the signal information; and the performing, based on the THz signal by the receive-end signal processing module j, second phase modulation processing and second frequency mixing processing to obtain a second optical signal that carries the signal information includes:

performing, based on the m THz signals and a THz carrier of the receive-end THz source j by the receive-end frequency mixer j, second frequency mixing processing to obtain a second electrical signal that carries the signal information; converting, by the receive-end electrical-to-optical converter j, the second electrical signal to obtain a third optical signal; and performing, based on the third optical signal by the receive-end phase modulator j, second phase modulation processing to obtain the second optical signal that carries the signal information.

With reference to the first aspect, or the first, the second, the third, or the fourth possible implementation of the first aspect of the embodiments of the present disclosure, in a fifth possible implementation of the first aspect of the embodiments of the present disclosure, the transmit-end signal processing module i further includes a transmit-end serial-to-parallel converter i, and the transmit-end serial-to-parallel converter i is configured to divide a first high-speed signal into k first low-speed signals, where k is a positive integer greater than 1; and the transmit-end antenna i includes k transmit-end antenna i subarrays corresponding to the k first low-speed signals, where k is an integer greater than 1;

the receive-end signal processing module j further includes a receive-end serial-to-parallel converter j; the receive-end serial-to-parallel converter j is configured to combine k second low-speed signals into a second high-speed signal; and the receive-end antenna j includes k receive-end antenna j subarrays corresponding to the k second low-speed signals; and the k transmit-end antenna i subarrays are in a one-to-one correspondence with the k receive-end antenna j subarrays.

With reference to the first aspect, or the first, the second, the third, or the fourth possible implementation of the first aspect of the embodiments of the present disclosure, in a sixth possible implementation of the first aspect of the embodiments of the present disclosure, the transmit-end signal processing module i further includes an optical demultiplexer i; the optical demultiplexer i is configured to demultiplex a first n-wavelength signal into n first single-wavelength signals; and the transmit-end antenna i includes n transmit-end antenna i subarrays corresponding to the n first single-wavelength signals;

the receive-end signal processing module j further includes an optical multiplexer j; the optical multiplexer j is configured to combine n second single-wavelength signals into a second n-wavelength signal; the receive-end antenna j includes n receive-end antenna j subarrays corresponding to the n second single-wavelength signals; and n is an integer greater than 1; and the n transmit-end antenna i subarrays are in a one-to-one correspondence with the n receive-end antenna j subarrays.

A second aspect of the embodiments of the present disclosure provides an optical cross-connect apparatus, including:

N input ports, N transmit-end signal processing modules connected to the N input ports, N transmit-end antennas and a controller that are connected to the N transmit-end signal processing modules, M receive-end antennas, M receive-end signal processing modules connected to the M receive-end antennas, and M output ports connected to the M receive-end signal processing modules, where an input port i of the N input ports is connected to a transmit-end signal processing module i of the N transmit-end signal processing modules; the transmit-end signal processing module i is connected to a transmit-end antenna i of the N transmit-end antennas and the controller; an output port j of the M output ports is connected to a receive-end signal processing module j of the M receive-end signal processing modules; the receive-end signal processing module j is connected to a receive-end antenna j of the M receive-end antennas; and N and M are positive integers;

the input port i is configured to receive a first optical signal;

the transmit-end signal processing module i is configured to perform, based on the first optical signal, first phase modulation processing and first frequency mixing processing to obtain a terahertz (THz) signal that carries signal information of the first optical signal, where phase adjustment information used during first phase modulation processing includes first phase adjustment information that matches routing information and that is from the controller, and the routing information includes port information of the input port i and the output port j;

the transmit-end antenna i is configured to transmit the THz signal;

the receive-end antenna j is configured to receive the THz signal;

the receive-end signal processing module j is configured to perform, based on the THz signal, second phase modulation processing and second frequency mixing processing to obtain a second optical signal that carries the signal information, where phase adjustment information used during second phase modulation processing includes second phase adjustment information that matches the routing information and that is from the controller; and the output port j is configured to output the second optical signal.

In a first possible implementation of the second aspect of the embodiments of the present disclosure, the transmit-end signal processing module i includes a transmit-end optical-to-electrical converter connected to the input port i, a transmit-end power splitter i connected to the transmit-end optical-to-electrical converter i, and m transmit-end phase modulation and mixing modules i connected to the transmit-end power splitter i; the controller is connected to the m transmit-end phase modulation and mixing modules i; phases of m transmit-end phase modulators i in the m transmit-end phase modulation and mixing modules i include a phase that matches the first phase adjustment information; the transmit-end antenna i includes m transmit-end single antennas i connected to the m transmit-end phase modulation and mixing modules i; and m is an integer greater than 1;

the receive-end signal processing module j includes at least one receive-end phase modulation and mixing module j connected to the receive-end antenna j, and a receive-end electrical-to-optical converter j connected to the receive-end phase modulation and mixing module j; the receive-end electrical-to-optical converter j is connected to the output port j; the controller is connected to the receive-end phase modulation and mixing module j; a phase of a receive-end phase modulator j in the receive-end phase modulation and mixing module j includes a phase that matches the second phase adjustment information; and the receive-end antenna j includes at least one receive-end single antenna j connected to the at least one receive-end phase modulation and mixing module j;

the transmit-end optical-to-electrical converter i is configured to convert the first optical signal to obtain a first electrical signal;

the transmit-end power splitter i is configured to split the first electrical signal to obtain m power division electrical signals with a same power;

the m transmit-end phase modulation and mixing modules i are configured to perform, based on the m power division electrical signals, first phase modulation processing and first frequency mixing processing to obtain m THz signals that carry the signal information;

the at least one receive-end phase modulation and mixing module j is configured to perform, based on the m THz signals, second phase modulation processing and second frequency mixing processing to obtain a second electrical signal that carries the signal information; and the receive-end electrical-to-optical converter j is configured to convert the second electrical signal to obtain the second optical signal that carries the signal information.

In a second possible implementation of the second aspect of the embodiments of the present disclosure, the transmit-end signal processing module i includes a transmit-end optical-to-electrical converter connected to the input port i, a transmit-end electrical signal processor i connected to the transmit-end optical-to-electrical converter i, a transmit-end power splitter i connected to the transmit-end electrical signal processor i, and m transmit-end phase modulation and mixing modules i connected to the transmit-end power splitter i; the transmit-end electrical signal processor i is connected to the controller; the controller is connected to the m transmit-end phase modulation and mixing modules i; the transmit-end antenna i includes m transmit-end single antennas i connected to the m transmit-end phase modulation and mixing modules i; and m is an integer greater than 1;

the receive-end signal processing module j includes at least one receive-end phase modulation and mixing module j connected to the receive-end antenna j, and a receive-end electrical-to-optical converter j connected to the receive-end phase modulation and mixing module j; the receive-end electrical-to-optical converter j is connected to the output port j; the controller is connected to the receive-end phase modulation and mixing module j; and the receive-end antenna j includes at least one receive-end single antenna j connected to the at least one receive-end phase modulation and mixing module j;

the transmit-end optical-to-electrical converter i is configured to convert the first optical signal to obtain a first electrical signal;

the transmit-end electrical signal processor i is configured to: extract the routing information of the first electrical signal, send a phase modulation information obtaining request that carries the routing information to the controller, send the first phase adjustment information to the m transmit-end phase modulation and mixing modules i, and send the second phase adjustment information to the at least one receive-end phase modulation and mixing module j, where the phase modulation information obtaining request is used to instruct the controller to query a prestored routing table to obtain the first phase adjustment information and the second phase adjustment information that match the routing information;

m transmit-end phase modulators i in the m transmit-end phase modulation and mixing modules i are configured to adjust a phase to a phase corresponding to the first phase adjustment information;

a receive-end phase modulator j in the at least one receive-end phase modulation and mixing module j is configured to adjust a phase to a phase corresponding to the second phase adjustment information;

the transmit-end power splitter i is configured to split the first electrical signal to obtain m power division electrical signals with a same power;

the m transmit-end phase modulation and mixing modules i are configured to perform, based on the m power division electrical signals, first phase modulation processing and first frequency mixing processing to obtain m THz signals that carry the signal information;

the at least one receive-end phase modulation and mixing module j is configured to perform, based on the m THz signals, second phase modulation processing and second frequency mixing processing to obtain a second electrical signal that carries the signal information; and the receive-end electrical-to-optical converter j is configured to convert the second electrical signal to obtain the second optical signal that carries the signal information.

In a third possible implementation of the second aspect of the embodiments of the present disclosure, the transmit-end signal processing module i includes a transmit-end optical splitter i connected to the input port i, m transmit-end phase modulators i connected to the transmit-end optical splitter i, m transmit-end optical-to-electrical converters connected to the m transmit-end phase modulators i, m transmit-end frequency mixers i connected to the m transmit-end optical-to-electrical converters i, and m transmit-end THz sources i connected to the m transmit-end frequency mixers i; the controller is connected to the m transmit-end phase modulators i; phases of the m transmit-end phase modulators i include a phase that matches the first phase adjustment information; the transmit-end antenna i includes m transmit-end single antennas i connected to the m transmit-end frequency mixers i; and m is an integer greater than 1;

the receive-end signal processing module j includes at least one receive-end frequency mixer j connected to the receive-end antenna j, a receive-end THz source j connected to the receive-end frequency mixer j, a receive-end electrical-to-optical converter j connected to the receive-end frequency mixer j, and a receive-end phase modulator j connected to the receive-end electrical-to-optical converter j; the receive-end phase modulator j is connected to the output port j; and a phase of the receive-end phase modulator j includes a phase that matches the second phase adjustment information;

the transmit-end optical splitter i is configured to split the first optical signal to obtain m power division optical signals with a same power;

the m transmit-end phase modulators i are configured to perform, based on the m power division optical signals, first phase modulation processing to obtain m first phase modulation optical signals;

the m transmit-end optical-to-electrical converters i are configured to convert the m first phase modulation optical signals to obtain m first electrical signals;

the m transmit-end frequency mixers i are configured to perform, based on the m first electrical signals and m THz carriers of the m transmit-end THz sources i, first frequency mixing processing to obtain m THz signals that carry the signal information;

the receive-end frequency mixer j is configured to perform, based on the m THz signals and a THz carrier of the receive-end THz source j, second frequency mixing processing to obtain a second electrical signal that carries the signal information;

the receive-end electrical-to-optical converter j is configured to convert the second electrical signal to obtain a third optical signal; and the receive-end phase modulator j is configured to perform, based on the third optical signal, second phase modulation processing to obtain the second optical signal that carries the signal information.

In a fourth possible implementation of the second aspect of the embodiments of the present disclosure, the transmit-end signal processing module i includes a transmit-end optical signal processor i connected to the input port i, a transmit-end optical splitter i connected to the transmit-end optical signal processor i, m transmit-end phase modulators i connected to the transmit-end optical splitter i, m transmit-end optical-to-electrical converters i connected to the m transmit-end phase modulators i, m transmit-end frequency mixers i connected to the m transmit-end optical-to-electrical converters, and m transmit-end THz sources i connected to the m transmit-end frequency mixers i; the transmit-end optical signal processor i is connected to the controller; the controller is connected to the m transmit-end phase modulators i; and the transmit-end antenna i includes m transmit-end single antennas i connected to the m transmit-end frequency mixers i;

the receive-end signal processing module j includes at least one receive-end frequency mixer j connected to the receive-end antenna j, a receive-end THz source j and a receive-end electrical-to-optical converter j that are connected to the receive-end frequency mixer j, and a receive-end phase modulator j connected to the receive-end electrical-to-optical converter j; the receive-end phase modulator j is connected to the output port j; the controller is connected to the receive-end phase modulator j; and the receive-end antenna j includes at least one receive-end single antenna j connected to the at least one receive-end frequency mixer j;

the transmit-end optical signal processor i is configured to: extract routing information of the first optical signal, send a phase modulation information obtaining request that carries the routing information to the controller, send the first phase adjustment information to the m transmit-end phase modulators i, and send the second phase adjustment information to at least one receive-end phase modulator j corresponding to the at least one receive-end frequency mixer j, where the phase modulation information obtaining request is used to instruct the controller to query a prestored routing table to obtain first phase adjustment information and second phase adjustment information that match the routing information;

the m transmit-end phase modulators i are configured to adjust a phase to a phase corresponding to the first phase adjustment information;

the at least one receive-end phase modulator j is configured to adjust a phase to a phase corresponding to the second phase adjustment information;

the transmit-end optical splitter i is configured to split the first optical signal to obtain m power division optical signals with a same power;

the m transmit-end phase modulators i are configured to perform, based on the m power division optical signals, first phase modulation processing to obtain m first phase modulation optical signals;

the m transmit-end optical-to-electrical converters i are configured to convert the m first phase modulation optical signals to obtain m first electrical signals;

the m transmit-end frequency mixers i are configured to perform, based on the m first electrical signals and m THz carriers of the m transmit-end THz sources i, first frequency mixing processing to obtain m THz signals that carry the signal information;

the receive-end frequency mixer j is configured to perform, based on the m THz signals and a THz carrier of the receive-end THz source j, second frequency mixing processing to obtain a second electrical signal that carries the signal information;

the receive-end electrical-to-optical converter j is configured to convert the second electrical signal to obtain a third optical signal; and the receive-end phase modulator j is configured to perform, based on the third optical signal, second phase modulation processing to obtain the second optical signal that carries the signal information.

With reference to the second aspect, or the first, the second, the third, or the fourth possible implementation of the second aspect of the embodiments of the present disclosure, in a fifth possible implementation of the second aspect of the embodiments of the present disclosure, the transmit-end signal processing module i further includes a transmit-end serial-to-parallel converter i, and the transmit-end serial-to-parallel converter i is configured to divide a first high-speed signal into k first low-speed signals, where k is a positive integer greater than 1; and the transmit-end antenna i includes k transmit-end antenna i subarrays corresponding to the k first low-speed signals, where k is an integer greater than 1;

the receive-end signal processing module j further includes a receive-end serial-to-parallel converter j; the receive-end serial-to-parallel converter j is configured to combine k second low-speed signals into a second high-speed signal; and the receive-end antenna j includes k receive-end antenna j subarrays corresponding to the k second low-speed signals; and the k transmit-end antenna i subarrays are in a one-to-one correspondence with the k receive-end antenna j subarrays.

With reference to the second aspect, or the first, the second, the third, or the fourth possible implementation of the second aspect of the embodiments of the present disclosure, in a sixth possible implementation of the second aspect of the embodiments of the present disclosure, the transmit-end signal processing module i further includes an optical demultiplexer i; the optical demultiplexer i is configured to demultiplex a first n-wavelength signal into n first single-wavelength signals; and the transmit-end antenna i includes n transmit-end antenna i subarrays corresponding to the n first single-wavelength signals;

the receive-end signal processing module j further includes an optical multiplexer j; the optical multiplexer j is configured to combine n second single-wavelength signals into a second n-wavelength signal; the receive-end antenna j includes n receive-end antenna j subarrays corresponding to the n second single-wavelength signals; and n is an integer greater than 1; and the n transmit-end antenna i subarrays are in a one-to-one correspondence with the n receive-end antenna j subarrays.

In some possible implementations, the routing information may be routing information that is obtained by the controller from the signal information of the first optical signal, or may be routing information that is preset by a user and that is received by the controller. A manner of obtaining the routing information is not uniquely limited in the present disclosure. The first phase adjustment information that matches the routing information is used to adjust a phase of the transmit-end phase modulator i in the transmit-end signal processing module i to a first phase corresponding to the first phase adjustment information. The second phase adjustment information that matches the routing information is used to adjust a phase of the receive-end phase modulator j in the receive-end signal processing module j to a second state corresponding to the second phase adjustment information. The transmit-end phase modulator i in a first phase state and the receive-end phase modulator j in a second phase state are matched. In this case, a signal transmission link from the transmit-end antenna i to the receive-end antenna j is already established. The transmit-end optical-to-electrical converter i in the transmit-end signal processing module i may include an adjustable laser. The transmit-end optical-to-electrical converter i can be configured to adjust a wavelength of a signal, to avoid a wavelength conflict.

In the embodiments of the present disclosure, first, the input port i of the optical cross-connect apparatus receives the first optical signal. Next, the transmit-end signal processing module i of the optical cross-connect apparatus performs, based on the first optical signal, first phase modulation processing and first frequency mixing processing to obtain the THz signal that carries the signal information of the first optical signal. Then, the transmit-end antenna i corresponding to the input port i of the optical cross-connect apparatus directionally transmits, based on the beamforming technology, the THz signal to the receive-end antenna j corresponding to the output port j, and the receive-end antenna j receives the THz signal. After that, the receive-end signal processing module j of the optical cross-connect apparatus performs, based on the THz signal, second phase modulation processing and second frequency mixing processing to obtain the second optical signal that carries the signal information. Finally, the output port j of the optical cross-connect apparatus outputs the second optical signal. The phase adjustment information used during first phase modulation processing includes the first phase adjustment information that matches the routing information and that is from the controller, and the phase adjustment information used during second phase modulation processing includes the second phase adjustment information that matches the routing information and that is from the controller. Therefore, it can be learnt that the optical cross-connect apparatus can adjust, based on the phase adjustment information, the phase at the transmit end and the phase at the receive end, and quickly implement, based on the beamforming technology, the directional switching of the signal transmission link by using the transmit-end antenna i and the receive-end antenna j. This helps increase the switching speed of the optical cross-connect apparatus. In addition, the THz-related components of the optical cross-connect apparatus can be integrated by using the complementary metal-oxide-semiconductor (CMOS). This helps reduce apparatus costs, and increase the integration degree and the expansion scale of the apparatus.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 4.1 is a detailed schematic flowchart of step S202 in the optical signal processing method shown in FIG. 2 according to a second method embodiment of the present disclosure;

FIG. 4.2 is a detailed schematic flowchart of step S205 in the optical signal processing method shown in FIG. 2 according to a second method embodiment of the present disclosure;

FIG. 6.1 is a detailed schematic flowchart of step S202 in the optical signal processing method shown in FIG. 2 according to a third method embodiment of the present disclosure;

FIG. 6.2 is a detailed schematic flowchart of step S205 in an optical signal processing method according to a third method embodiment of the present disclosure;

FIG. 7.1 is a first optional schematic structural diagram of a transmit-end phase modulation and mixing module i in the optical cross-connect apparatus shown in FIG. 3 or FIG. 5 according to an embodiment of the present disclosure;

FIG. 7.2 is a first optional schematic structural diagram of a receive-end phase modulation and mixing module j in the optical cross-connect apparatus shown in FIG. 3 or FIG. 5 according to an embodiment of the present disclosure;

FIG. 7.3 is a second optional schematic structural diagram of a receive-end phase modulation and mixing module j in the optical cross-connect apparatus shown in FIG. 3 or FIG. 5 according to an embodiment of the present disclosure;

FIG. 7.4 is a second optional schematic structural diagram of a transmit-end phase modulation and mixing module i in the optical cross-connect apparatus shown in FIG. 3 or FIG. 5 according to an embodiment of the present disclosure;

FIG. 7.5 is a third optional schematic structural diagram of a receive-end phase modulation and mixing module j in the optical cross-connect apparatus shown in FIG. 3 or FIG. 5 according to an embodiment of the present disclosure;

FIG. 7.6 is a fourth optional schematic structural diagram of a receive-end phase modulation and mixing module j in the optical cross-connect apparatus shown in FIG. 3 or FIG. 5 according to an embodiment of the present disclosure;

FIG. 7.7 is a third optional schematic structural diagram of a transmit-end phase modulation and mixing module i in the optical cross-connect apparatus shown in FIG. 3 or FIG. 5 according to an embodiment of the present disclosure;

FIG. 7.8 is a fifth optional schematic structural diagram of a receive-end phase modulation and mixing module j in the optical cross-connect apparatus shown in FIG. 3 or FIG. 5 according to an embodiment of the present disclosure;

FIG. 7.9 is a sixth optional schematic structural diagram of a receive-end phase modulation and mixing module j in the optical cross-connect apparatus shown in FIG. 3 or FIG. 5 according to an embodiment of the present disclosure;

FIG. 8.1 and FIG. 8.2 are an optional schematic structural diagram based on the optical cross-connect apparatus shown in FIG. according to a fourth apparatus embodiment of the present disclosure;

FIG. 9.1 is a detailed schematic flowchart of step S202 in the optical signal processing method shown in FIG. 2 according to a fourth method embodiment of the present disclosure;

FIG. 9.2 is a detailed schematic flowchart of step S205 in the optical signal processing method shown in FIG. 2 according to a fourth method embodiment of the present disclosure;

FIG. 10.1 and FIG. 10.2 are an optional schematic structural diagram based on the optical cross-connect apparatus shown in FIG. 1 according to a fifth apparatus embodiment of the present disclosure;

FIG. 11.1 is a detailed schematic flowchart of step S202 in the optical signal processing method shown in FIG. 2 according to a fourth method embodiment of the present disclosure;

FIG. 11.2 is a detailed schematic flowchart of step S205 in the optical signal processing method shown in FIG. 2 according to a fourth method embodiment of the present disclosure;

FIG. 12.1 and FIG. 12.2 are an optional schematic structural diagram based on the optical cross-connect apparatus shown in FIG. 3 according to a sixth apparatus embodiment of the present disclosure;

FIG. 13.1 and FIG. 13.2 are an optional schematic structural diagram based on the optical cross-connect apparatus shown in FIG. according to a seventh apparatus embodiment of the present disclosure; and FIG. 14.1 and FIG. 14.2 are an optional schematic structural diagram based on the optical cross-connect apparatus shown in FIG. according to an eighth apparatus embodiment of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Embodiments of the present disclosure provide an optical signal processing method and an optical cross-connect apparatus, so as to increase a switching speed of the optical cross-connect apparatus, reduce apparatus costs, and increase an integration degree and an expansion scale of the apparatus.

In the specification, claims, and accompanying drawings of the present disclosure, the terms "first", "second", "third", "fourth", and so on are intended to distinguish between different objects but do not indicate a particular sequence. In addition, the terms "including", "comprising", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
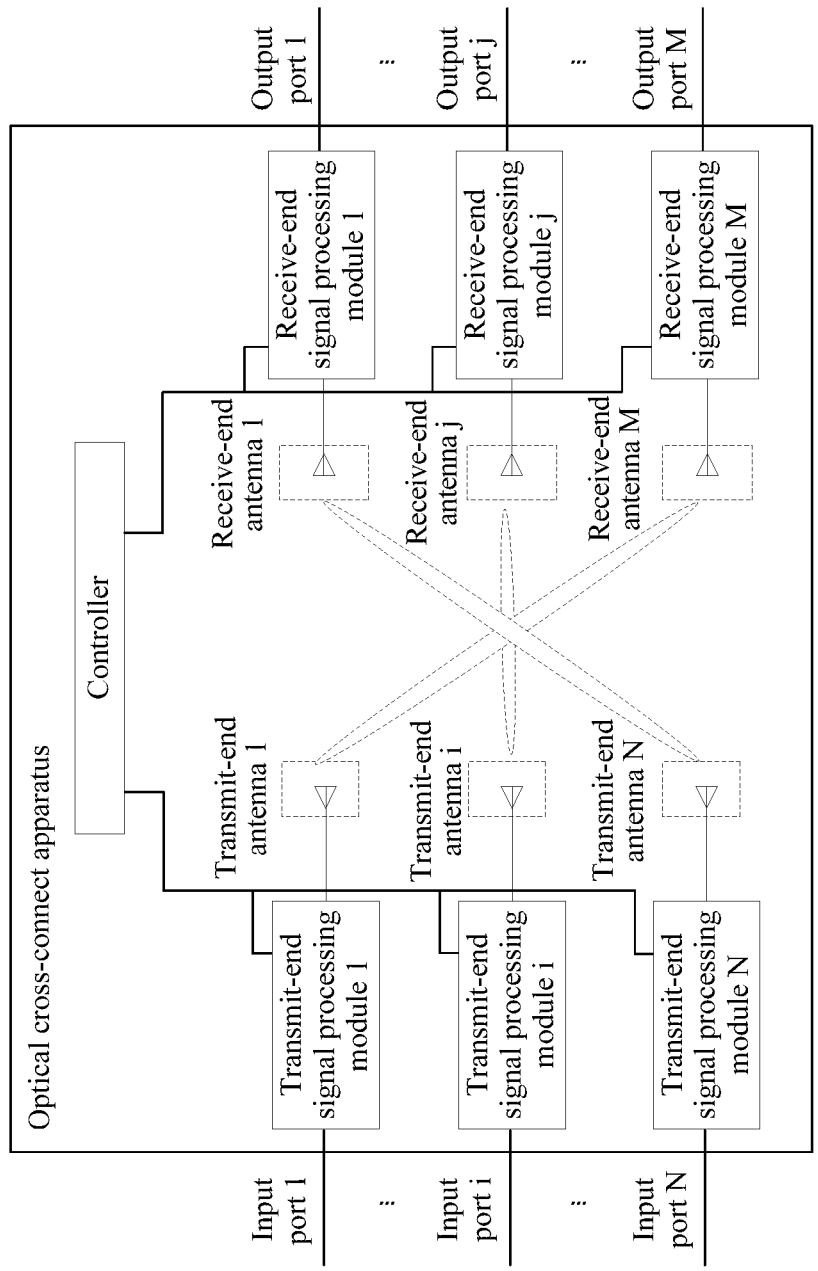
FIG. 1 is a schematic structural diagram of an optical cross-connect apparatus for directionally switching an optical signal transmission link according to a first apparatus embodiment of the present disclosure.

For ease of understanding the embodiments of the present disclosure, the following first describes a structural composition of an optical cross-connect apparatus according to an embodiment of the present disclosure. Referring to FIG. 1, FIG. 1 is a schematic structural diagram of an optical cross-connect apparatus for directionally switching an optical signal transmission link according to a first apparatus embodiment of the present disclosure.

As shown in FIG. 1, the optical cross-connect apparatus includes:

N input ports, N transmit-end signal processing modules connected to the N input ports, N transmit-end antennas and a controller that are connected to the N transmit-end signal processing modules, M receive-end antennas, M receive-end signal processing modules connected to the M receive-end antennas, and M output ports connected to the M receive-end signal processing modules.

An input port i of the N input ports is connected to a transmit-end signal processing module i of the N transmit-end signal processing modules. The transmit-end signal processing module i is connected to a transmit-end antenna i of the N transmit-end antennas and the controller. An output port j of the M output ports is connected to a receive-end signal processing module j of the M receive-end signal processing modules. The receive-end signal processing module j is connected to a receive-end antenna j of the M receive-end antennas. N and M are positive integers.

With reference to FIG. 1, it can be learnt that the first apparatus embodiment of the present disclosure provides an optical cross-connect apparatus at a scale of N*M. In the optical cross-connect apparatus, each input port is connected to a transmit-end signal processing module. Each transmit-end signal processing module is correspondingly connected to a transmit-end antenna. The transmit-end antennas should form an antenna array. For example, an input port 1 is connected to a transmit-end signal processing module 1, and the transmit-end signal processing module 1 is connected to a transmit-end antenna 1. The transmit-end antenna 1 may specifically include m transmit-end single antennas 1, and m is an integer greater than 1.

The controller in the optical cross-connect apparatus is connected to a transmit-end signal processing module and a receive-end signal processing module, and configured to adjust, based on routing information, a phase of a transmit-end phase modulator in the transmit-end signal processing module and a phase of a receive-end phase modulator in the receive-end signal processing module, so that a signal transmitted by a transmit-end antenna can be directionally transmitted to a receive-end antenna. Further, the receive-end signal processing module connected to the transmit-end antenna processes the received signal. Finally, the signal is output from a corresponding output port. This implements a directional switching of a signal transmission link.

In a specific implementation of the optical cross-connect apparatus, the input port i is configured to receive a first optical signal.

The transmit-end signal processing module i is configured to perform, based on the first optical signal, first phase modulation processing and first frequency mixing processing to obtain a terahertz (THz) signal that carries signal information of the first optical signal. Phase adjustment information used during first phase modulation processing includes first phase adjustment information that matches routing information and that is from the controller. The routing information includes port information of the input port i and the output port j.

The transmit-end antenna i is configured to transmit the THz signal.

The receive-end antenna j is configured to receive the THz signal.

The receive-end signal processing module j is configured to perform, based on the THz signal, second phase modulation processing and second frequency mixing processing to obtain a second optical signal that carries the signal information. Phase adjustment information used during second phase modulation processing includes second phase adjustment information that matches the routing information and that is from the controller.

The output port j is configured to output the second optical signal.

An instance in which port information in the routing information is the port information of the input port i and the output port j is used to describe in detail a signal processing procedure based on the optical cross-connect apparatus shown in FIG. 1.

Figure 2:
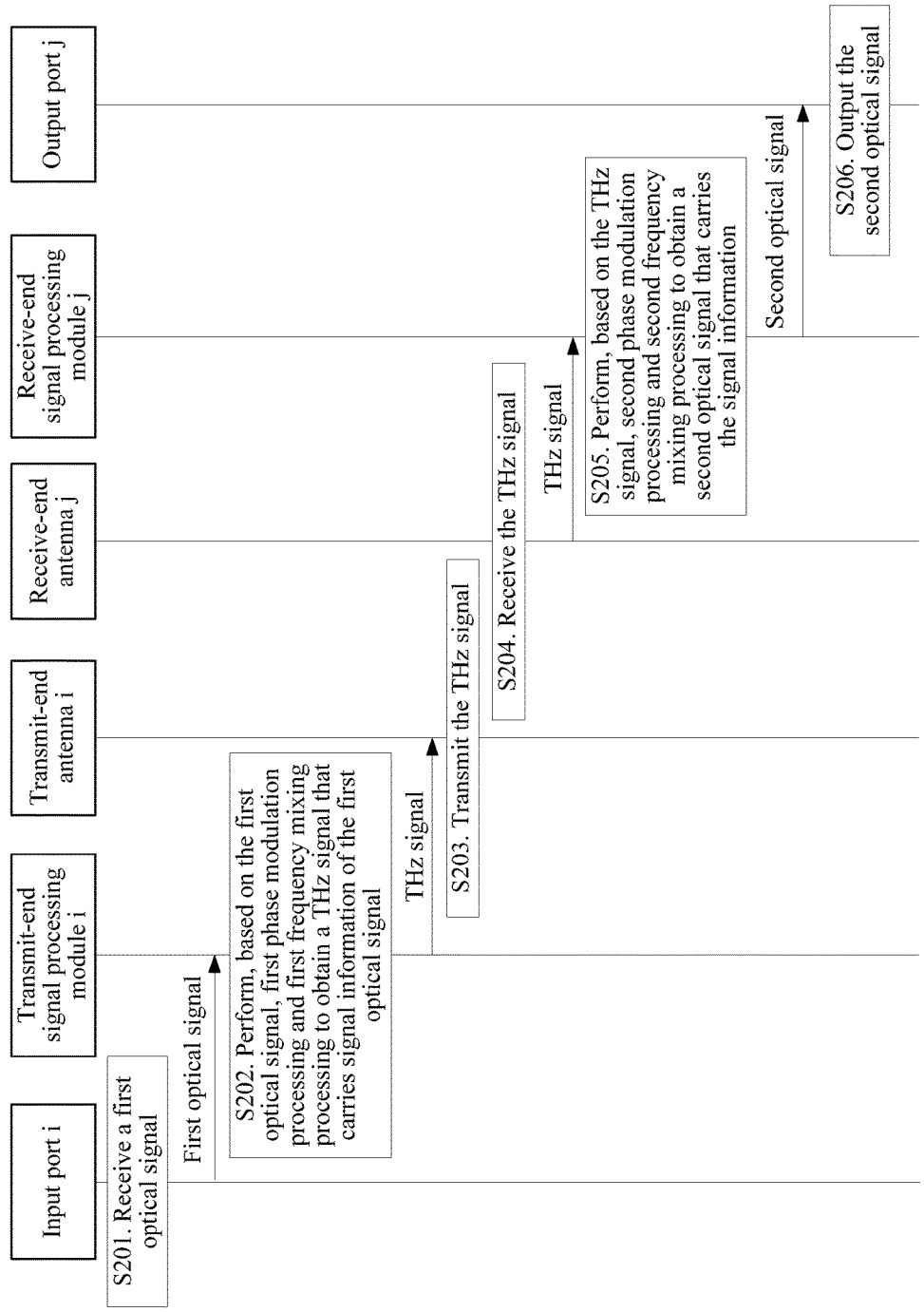
FIG. 2 is a schematic flowchart of an optical signal processing method based on the optical cross-connect apparatus shown in FIG. 1 according to a first method embodiment of the present disclosure.

Referring to FIG. 2, FIG. 2 is a schematic flowchart of an optical signal processing method based on the optical cross-connect apparatus shown in FIG. 1 according to a first method embodiment of the present disclosure. As shown in FIG. 2, the optical signal processing method specifically includes the following steps:

S201. The input port i of the optical cross-connect apparatus receives a first optical signal.

S202. The transmit-end signal processing module i of the optical cross-connect apparatus performs, based on the first optical signal, first phase modulation processing and first frequency mixing processing to obtain a terahertz (THz) signal that carries signal information of the first optical signal, where phase adjustment information used during first phase modulation processing includes first phase adjustment information that matches routing information and that is from the controller, and the routing information includes port information of the input port i and the output port j.

The routing information may be routing information that is obtained by the controller from the signal information of the first optical signal, or may be routing information that is preset by a user and that is received by the controller. A manner of obtaining the routing information is not uniquely limited in the present disclosure.

S203. The transmit-end antenna i of the optical cross-connect apparatus transmits the THz signal.

A phase of a transmit-end phase modulator i in the transmit-end signal processing module i connected to the transmit-end antenna i includes a first phase corresponding to the first phase adjustment information that matches the routing information.

S204. The receive-end antenna j of the optical cross-connect apparatus receives the THz signal.

A phase of a receive-end phase modulator j in the receive-end signal processing module j connected to the receive-end antenna j includes a second phase corresponding to second phase adjustment information that matches the routing information.

The transmit-end phase modulator i in a first phase state matches the receive-end phase modulator j in a second phase state. In this case, a signal transmission link from the transmit-end antenna i to the receive-end antenna j is already established.

Specifically, in a process in which the transmit-end antenna i transmits a signal and the receive-end antenna j receives the signal, a signal phase is adjusted (that is, first phase modulation processing), so that THz signals transmitted by the transmit-end antenna i meet a delay or advancement of phase progressing, and the radiated THz signals are spatially superimposed in a specific direction and cancelled out in another direction. In this way, energy of the transmitted THz signal is directed to the specific direction. In terms of effects, a main beam of an antenna array of transmit-end antennas is directed to the specific direction, thereby implementing directional switching of a signal transmission link.

S205. The receive-end signal processing module j of the optical cross-connect apparatus performs, based on the THz signal, second phase modulation processing and second frequency mixing processing to obtain a second optical signal that carries the signal information, where phase adjustment information used during second phase modulation processing includes second phase adjustment information that matches the routing information and that is from the controller.

S206. The output port j of the optical cross-connect apparatus outputs the second optical signal.

It can be learnt that in this embodiment of the present disclosure, first, the input port i of the optical cross-connect apparatus receives the first optical signal. Next, the transmit-end signal processing module i of the optical cross-connect apparatus performs, based on the first optical signal, first phase modulation processing and first frequency mixing processing to obtain the THz signal that carries the signal information of the first optical signal. Then, the transmit-end antenna i corresponding to the input port i of the optical cross-connect apparatus directionally transmits, based on a beamforming technology, the THz signal to the receive-end antenna j corresponding to the output port j, and the receive-end antenna j receives the THz signal. After that, the receive-end signal processing module j of the optical cross-connect apparatus performs, based on the THz signal, second phase modulation processing and second frequency mixing processing to obtain the second optical signal that carries the signal information. Finally, the output port j of the optical cross-connect apparatus outputs the second optical signal. The phase adjustment information used during first phase modulation processing includes the first phase adjustment information that matches the routing information and that is from the controller, and the phase adjustment information used during second phase modulation processing includes the second phase adjustment information that matches the routing information and that is from the controller. Therefore, it can be learnt that the optical cross-connect apparatus can adjust, based on the phase adjustment information, a phase at a transmit end and a phase at a receive end, and quickly implement, based on the beamforming technology, the directional switching of the signal transmission link by using the transmit-end antenna i and the receive-end antenna j. This helps increase a switching speed of the optical cross-connect apparatus. In addition, THz-related components of the optical cross-connect apparatus can be integrated by using a complementary metal-oxide-semiconductor (CMOS). This helps reduce apparatus costs, and increase an integration degree and an expansion scale of the apparatus.

Figure 3:
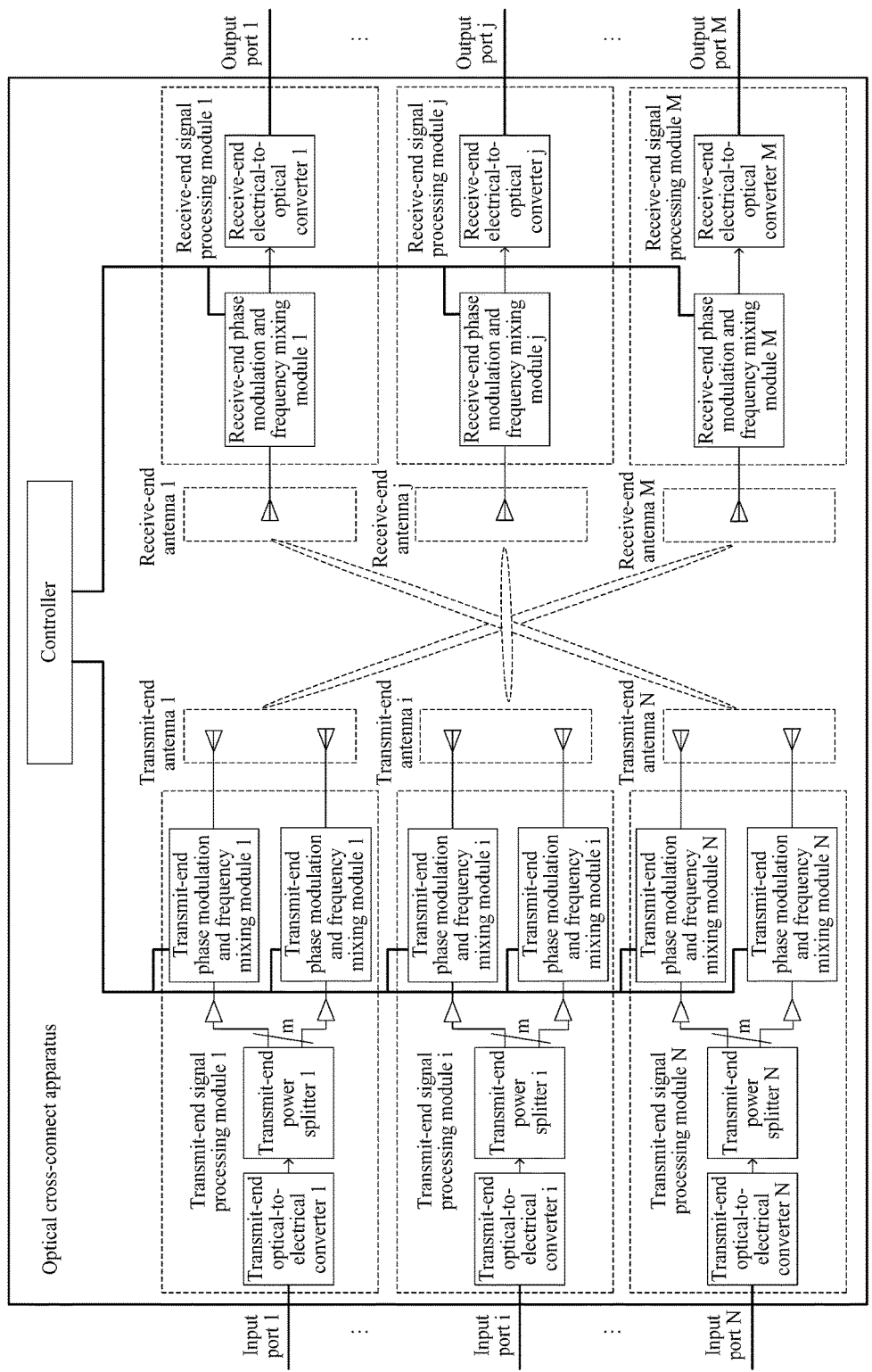
FIG. 3 is an optional schematic structural diagram based on the optical cross-connect apparatus shown in FIG. 1 according to a second apparatus embodiment of the present disclosure.

Further, referring to FIG. 3, FIG. 3 is an optional schematic structural diagram based on the optical cross-connect apparatus shown in FIG. 1 according to a second apparatus embodiment of the present disclosure. As shown in FIG. 3, in the optical cross-connect apparatus:

the transmit-end signal processing module i includes a transmit-end optical-to-electrical converter connected to the input port i, a transmit-end power splitter i connected to the transmit-end optical-to-electrical converter i, and m transmit-end phase modulation and mixing modules i connected to the transmit-end power splitter i; the controller is connected to the m transmit-end phase modulation and mixing modules i; phases of m transmit-end phase modulators i in the m transmit-end phase modulation and mixing modules i include a phase that matches the first phase adjustment information; the transmit-end antenna i includes m transmit-end single antennas i connected to the m transmit-end phase modulation and mixing modules i; and m is an integer greater than 1; and the receive-end signal processing module j includes at least one receive-end phase modulation and mixing module j connected to the receive-end antenna j, and a receive-end electrical-to-optical converter j connected to the receive-end phase modulation and mixing module j; the receive-end electrical-to-optical converter j is connected to the output port j; the controller is connected to the receive-end phase modulation and mixing module j; a phase of a receive-end phase modulator j in the receive-end phase modulation and mixing module j includes a phase that matches the second phase adjustment information; and the receive-end antenna j includes at least one receive-end single antenna j connected to the at least one receive-end phase modulation and mixing module j.

Similarly, specific compositional structures of a transmit-end signal processing module connected to another input port and a transmit-end antenna of the optical cross-connect apparatus are consistent with those of the transmit-end signal processing module i connected to the input port i and the transmit-end antenna i. Specific compositional structures of a receive-end signal processing module connected to another output port and a receive-end antenna of the optical cross-connect apparatus are consistent with those of the receive-end signal processing module j connected to the output port j and the receive-end antenna j. Details are not further described herein.

In a specific implementation of the optical cross-connect apparatus, the transmit-end optical-to-electrical converter i is configured to convert the first optical signal to obtain a first electrical signal.

The transmit-end power splitter i is configured to split the first electrical signal to obtain m power division electrical signals with a same power.

Them transmit-end phase modulation and mixing modules i are configured to perform, based on the m power division electrical signals, first phase modulation processing and first frequency mixing processing to obtain m THz signals that carry the signal information.

The at least one receive-end phase modulation and mixing module j is configured to perform, based on the m THz signals, second phase modulation processing and second frequency mixing processing to obtain a second electrical signal that carries the signal information.

The receive-end electrical-to-optical converter j is configured to convert the second electrical signal to obtain the second optical signal that carries the signal information.

Optionally, based on the structure of the optical cross-connect apparatus shown in FIG. 3, further, referring to FIG. 4.1, FIG. 4.1 is a detailed schematic flowchart of step S202 in the optical signal processing method shown in FIG. 2 according to a second method embodiment of the present disclosure. As shown in FIG. 4.1, step S202 in which the transmit-end signal processing module i performs, based on the first optical signal, first phase modulation processing and first frequency mixing processing to obtain a THz signal that carries signal information of the first optical signal includes the following steps:

S202-a1. The transmit-end optical-to-electrical converter i of the optical cross-connect apparatus converts the first optical signal to obtain a first electrical signal.

S202-a2. The transmit-end power splitter i of the optical cross-connect apparatus splits the first electrical signal to obtain m power division electrical signals with a same power.

S202-a3. The m transmit-end phase modulation and mixing modules i of the optical cross-connect apparatus perform, based on the m power division electrical signals, first phase modulation processing and first frequency mixing processing to obtain m THz signals that carry the signal information.

Optionally, based on the structure of the optical cross-connect apparatus shown in FIG. 3, further, referring to FIG. 4.2, FIG. 4.2 is a detailed schematic flowchart of step S205 in the optical signal processing method shown in FIG. 2 according to the second method embodiment of the present disclosure. As shown in FIG. 4.2, step S205 in which the receive-end signal processing module j performs, based on the THz signal, second phase modulation processing and second frequency mixing processing to obtain a second optical signal that carries the signal information includes the following steps:

S205-a1. The at least one receive-end phase modulation and mixing module j of the optical cross-connect apparatus performs, based on the m THz signals, second phase modulation processing and second frequency mixing processing to obtain a second electrical signal that carries the signal information.

S205-a2. The receive-end electrical-to-optical converter j of the optical cross-connect apparatus converts the second electrical signal to obtain the second optical signal that carries the signal information.

Similarly, signal input, transmission, reception, and output processes in the optical signal processing method disclosed in this embodiment of the present disclosure are consistent with step S201 (signal input), step S203 (signal transmission), step S204 (signal reception), and step S206 (signal output) in the first method embodiment of the present disclosure. Details are not further described herein.

Figure 5:
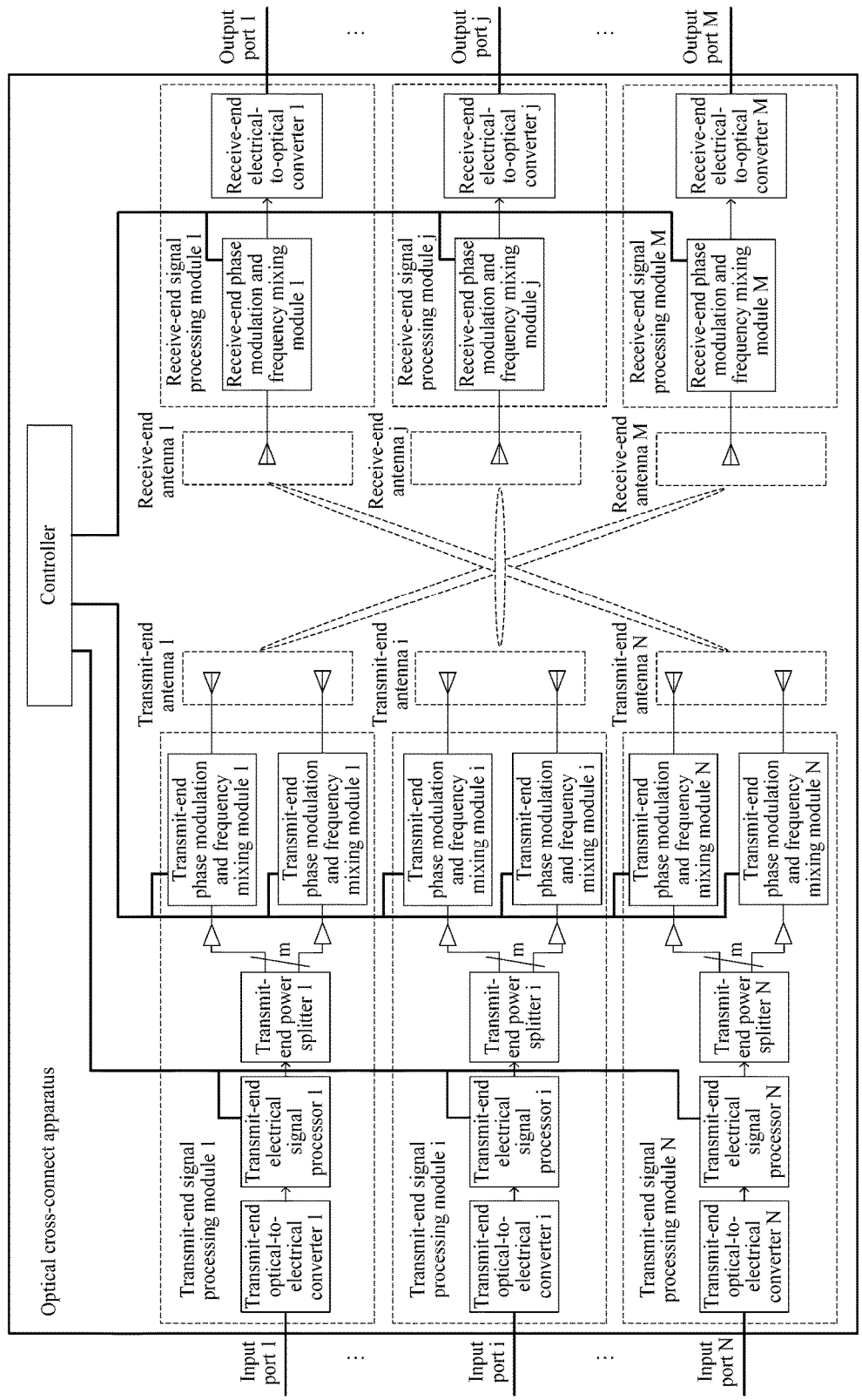
FIG. 5 is an optional schematic structural diagram based on the optical cross-connect apparatus shown in FIG. 1 according to a third apparatus embodiment of the present disclosure.

Further, referring to FIG. 5, FIG. 5 is an optional schematic structural diagram based on the optical cross-connect apparatus shown in FIG. 1 according to a third apparatus embodiment of the present disclosure. As shown in FIG. 5, in the optical cross-connect apparatus:

the transmit-end signal processing module i includes a transmit-end optical-to-electrical converter connected to the input port i, a transmit-end electrical signal processor i connected to the transmit-end optical-to-electrical converter i, a transmit-end power splitter i connected to the transmit-end electrical signal processor i, and m transmit-end phase modulation and mixing modules i connected to the transmit-end power splitter i; the transmit-end electrical signal processor i is connected to the controller; the controller is connected to the m transmit-end phase modulation and mixing modules i; the transmit-end antenna i includes m transmit-end single antennas i connected to the m transmit-end phase modulation and mixing modules i; and m is an integer greater than 1; and the receive-end signal processing module j includes at least one receive-end phase modulation and mixing module j connected to the receive-end antenna j, and a receive-end electrical-to-optical converter j connected to the receive-end phase modulation and mixing module j; the receive-end electrical-to-optical converter j is connected to the output port j; the controller is connected to the receive-end phase modulation and mixing module j; and the receive-end antenna j includes at least one receive-end single antenna j connected to the at least one receive-end phase modulation and mixing module j.

Similarly, specific compositional structures of a transmit-end signal processing module connected to another input port and a transmit-end antenna of the optical cross-connect apparatus are consistent with those of the transmit-end signal processing module i connected to the input port i and the transmit-end antenna i. Specific compositional structures of a receive-end signal processing module connected to another output port and a receive-end antenna of the optical cross-connect apparatus are consistent with those of the receive-end signal processing module j connected to the output port j and the receive-end antenna j. Details are not further described herein.

In a specific implementation of the optical cross-connect apparatus, the transmit-end optical-to-electrical converter i is configured to convert the first optical signal to obtain a first electrical signal.

The transmit-end electrical signal processor i is configured to: extract the routing information of the first electrical signal, send a phase modulation information obtaining request that carries the routing information to the controller, send the first phase adjustment information to the m transmit-end phase modulation and mixing modules i, and send the second phase adjustment information to the at least one receive-end phase modulation and mixing module j, where the phase modulation information obtaining request is used to instruct the controller to query a prestored routing table to obtain the first phase adjustment information and the second phase adjustment information that match the routing information.

m transmit-end phase modulators i in the m transmit-end phase modulation and mixing modules i are configured to adjust a phase to a phase corresponding to the first phase adjustment information.

A receive-end phase modulator j in the at least one receive-end phase modulation and mixing module j is configured to adjust a phase to a phase corresponding to the second phase adjustment information.

The transmit-end power splitter i is configured to split the first electrical signal to obtain m power division electrical signals with a same power.

Them transmit-end phase modulation and mixing modules i are configured to perform, based on the m power division electrical signals, first phase modulation processing and first frequency mixing processing to obtain m THz signals that carry the signal information.

The at least one receive-end phase modulation and mixing module j is configured to perform, based on the m THz signals, second phase modulation processing and second frequency mixing processing to obtain a second electrical signal that carries the signal information.

The receive-end electrical-to-optical converter j is configured to convert the second electrical signal to obtain the second optical signal that carries the signal information.

Optionally, based on the optical cross-connect apparatus shown in FIG. 5, further, referring to FIG. 6.1, FIG. 6.1 is a detailed schematic flowchart of step S202 in the optical signal processing method shown in FIG. 2 according to a third method embodiment of the present disclosure. As shown in FIG. 6.1, step S202 in which the transmit-end signal processing module i performs, based on the first optical signal, first phase modulation processing and first frequency mixing processing to obtain a THz signal that carries signal information of the first optical signal includes the following steps:

S202-b1. The transmit-end optical-to-electrical converter i of the optical cross-connect apparatus converts the first optical signal to obtain a first electrical signal.

S202-b2. The transmit-end electrical signal processor i of the optical cross-connect apparatus extracts the routing information of the first electrical signal, sends a phase modulation information obtaining request that carries the routing information to the controller, sends the first phase adjustment information to the m transmit-end phase modulation and mixing modules i, and sends the second phase adjustment information to the at least one receive-end phase modulation and mixing module j, where the phase modulation information obtaining request is used to instruct the controller to query a prestored routing table to obtain the first phase adjustment information and the second phase adjustment information that match the routing information.

S202-b3. The m transmit-end phase modulators i in the m transmit-end phase modulation and mixing modules i of the optical cross-connect apparatus adjust a phase to a phase corresponding to the first phase adjustment information.

S202-b4. A receive-end phase modulator j in the at least one receive-end phase modulation and mixing module j of the optical cross-connect apparatus adjusts a phase to a phase corresponding to the second phase adjustment information.

S202-b5. The transmit-end power splitter i of the optical cross-connect apparatus splits the first electrical signal to obtain m power division electrical signals with a same power.

S202-b6. The m transmit-end phase modulation and mixing modules i of the optical cross-connect apparatus perform, based on the m power division electrical signals, first phase modulation processing and first frequency mixing processing to obtain m THz signals that carry the signal information.

Optionally, based on the structure of the optical cross-connect apparatus shown in FIG. 5, further, referring to FIG. 6.2, FIG. 6.2 is a detailed schematic flowchart of step S205 in the optical signal processing method shown in FIG. 2 according to the third method embodiment of the present disclosure. As shown in FIG. 6.2, step S205 in which the receive-end signal processing module j performs, based on the THz signal, second phase modulation processing and second frequency mixing processing to obtain a second optical signal that carries the signal information includes the following steps:

S205-b1. The at least one receive-end phase modulation and mixing module j of the optical cross-connect apparatus performs, based on the m THz signals, second phase modulation processing and second frequency mixing processing to obtain a second electrical signal that carries the signal information.

S205-b2. The receive-end electrical-to-optical converter j of the optical cross-connect apparatus converts the second electrical signal to obtain the second optical signal that carries the signal information.

Similarly, signal input, transmission, reception, and output processes in the optical signal processing method disclosed in this embodiment of the present disclosure are consistent with step S201 (signal input), step S203 (signal transmission), step S204 (signal reception), and step S206

(signal output) in the first method embodiment of the present disclosure. Details are not further described herein.

It can be understood that in the optical cross-connect apparatus shown in FIG. 3 or FIG. 5, the transmit-end phase modulation and mixing module i and the receive-end phase modulation and mixing module j may have various specific implementations.

In an embodiment, referring to FIG. 7.1, the transmit-end phase modulation and mixing module i includes a transmit-end phase modulator i connected to the transmit-end power splitter i, a transmit-end frequency mixer i connected to the transmit-end phase modulator i, and a transmit-end THz source i connected to the transmit-end frequency mixer i. The transmit-end frequency mixer i is connected to the transmit-end single antenna i. The transmit-end phase modulator i is connected to the controller.

When there is one receive-end phase modulation and mixing module j, referring to FIG. 7.2, the receive-end phase modulation and mixing module j includes a receive-end frequency mixer j connected to the receive-end antenna j, a THz source and a receive-end phase modulator j that are connected to the receive-end frequency mixer j. The receive-end phase modulator j is connected to the controller.

When there are ml receive-end phase modulation and mixing modules j, referring to FIG. 7.3, the receive-end antenna j includes ml receive-end single antennas j connected to the ml receive-end phase modulation and mixing modules j. The receive-end phase modulation and mixing module j includes ml receive-end frequency mixers j connected to the ml receive-end single antennas j, ml receive-end THz sources j and ml receive-end phase modulators j that are connected to the ml receive-end frequency mixers j, and a receive-end power splitter j connected to the ml receive-end phase modulators j, where ml is an integer greater than 1.

In another embodiment, referring to FIG. 7.4, the transmit-end phase modulation and mixing module includes a transmit-end frequency mixer i connected to the transmit-end power splitter i, and a transmit-end THz source i and a transmit-end phase modulator i that are connected to the transmit-end frequency mixer i. The transmit-end phase modulator i is connected to the transmit-end antenna i.

When there is one receive-end phase modulation and mixing module j, referring to FIG. 7.5, the receive-end phase modulation and mixing module j includes a receive-end phase modulator j connected to the receive-end antenna j, a receive-end frequency mixer j connected to the receive-end phase modulator j, and a receive-end THz source j connected to the receive-end frequency mixer j.

When there are ml receive-end phase modulation and mixing modules j, referring to FIG. 7.6, the receive-end antenna j includes ml receive-end single antennas j connected to the ml receive-end phase modulation and mixing modules j. The receive-end phase modulation and mixing module j includes ml receive-end phase modulators j connected to the ml receive-end single antennas j, ml receive-end frequency mixers j connected to the ml receive-end phase modulators j, ml receive-end THz sources connected to the ml receive-end frequency mixers j, and a receive-end power splitter j connected to the ml receive-end frequency mixers j, where ml is an integer greater than 1.

In another embodiment, referring to FIG. 7.7, the transmit-end phase modulation and mixing module includes a transmit-end frequency mixer i connected to the transmit-end power splitter i, a transmit-end phase modulator i connected to the transmit-end frequency mixer i, and a transmit-end THz source i connected to the transmit-end phase modulator i. The transmit-end frequency mixer i is connected to the transmit-end single antenna i.

When there is one receive-end phase modulation and mixing module j, referring to FIG. 7.8, the receive-end phase modulation and mixing module j includes a receive-end frequency mixer j connected to the receive-end antenna j, a receive-end phase modulator j connected to the receive-end frequency mixer j, and a receive-end THz source j connected to the receive-end phase modulator j.

When there are ml receive-end phase modulation and mixing modules j, referring to FIG. 7.9, the receive-end antenna j includes ml receive-end single antennas j connected to the ml receive-end phase modulation and mixing modules j. The receive-end phase modulation and mixing module j includes ml receive-end frequency mixers j connected to the ml receive-end single antennas j, ml receive-end phase modulators j connected to the ml receive-end frequency mixers j, ml receive-end THz sources j connected to the ml receive-end phase modulators j, and a receive-end power splitter j connected to the ml receive-end frequency mixers j.

Further, referring to FIG. 8.1 and FIG. 8.2, FIG. 8.1 and FIG. 8.2 are an optional schematic structural diagram based on the optical cross-connect apparatus shown in FIG. 1 according to a fourth apparatus embodiment of the present disclosure. As shown in FIG. 8.1 and FIG. 8.2, in the optical cross-connect apparatus:

the transmit-end signal processing module i includes a transmit-end optical splitter i connected to the input port i, m transmit-end phase modulators i connected to the transmit-end optical splitter i, m transmit-end optical-to-electrical converters connected to the m transmit-end phase modulators i, m transmit-end frequency mixers i connected to the m transmit-end optical-to-electrical converters i, and m transmit-end THz sources i connected to the m transmit-end frequency mixers i; the controller is connected to the m transmit-end phase modulators i; phases of the m transmit-end phase modulators i include a phase that matches the first phase adjustment information; the transmit-end antenna i includes m transmit-end single antennas i connected to the m transmit-end frequency mixers i; and m is an integer greater than 1; and the receive-end signal processing module j includes at least one receive-end frequency mixer j connected to the receive-end antenna j, a receive-end THz source j connected to the receive-end frequency mixer j, a receive-end electrical-to-optical converter j connected to the receive-end frequency mixer j, and a receive-end phase modulator j connected to the receive-end electrical-to-optical converter j; the receive-end phase modulator j is connected to the output port j; and a phase of the receive-end phase modulator j includes a phase that matches the second phase adjustment information.

Similarly, specific compositional structures of a transmit-end signal processing module connected to another input port and a transmit-end antenna of the optical cross-connect apparatus are consistent with those of the transmit-end signal processing module i connected to the input port i and the transmit-end antenna i. Specific compositional structures of a receive-end signal processing module connected to another output port and a receive-end antenna of the optical cross-connect apparatus are consistent with those of the receive-end signal processing module j connected to the output port j and the receive-end antenna j. Details are not further described herein.

In a specific implementation of the optical cross-connect apparatus, the transmit-end optical splitter i is configured to split the first optical signal to obtain m power division optical signals with a same power.

The m transmit-end phase modulators i are configured to perform, based on the m power division optical signals, first phase modulation processing to obtain m first phase modulation optical signals.

The m transmit-end optical-to-electrical converters i are configured to convert the m first phase modulation optical signals to obtain m first electrical signals.

The m transmit-end frequency mixers i are configured to perform, based on the m first electrical signals and m THz carriers of the m transmit-end THz sources i, first frequency mixing processing to obtain m THz signals that carry the signal information.

The receive-end frequency mixer j is configured to perform, based on the m THz signals and a THz carrier of the receive-end THz source j, second frequency mixing processing to obtain a second electrical signal that carries the signal information.

The receive-end electrical-to-optical converter j is configured to convert the second electrical signal to obtain a third optical signal.

The receive-end phase modulator j is configured to perform, based on the third optical signal, second phase modulation processing to obtain the second optical signal that carries the signal information.

Optionally, based on the optical cross-connect apparatus shown in FIG. 8.1 and FIG. 8.2, further, referring to FIG. 9.1, FIG. 9.1 is a detailed schematic flowchart of step S202 in the optical signal processing method shown in FIG. 2 according to a fourth method embodiment of the present disclosure. As shown in FIG. 9.1, step S202 in which the transmit-end signal processing module i performs, based on the first optical signal, first phase modulation processing and first frequency mixing processing to obtain a THz signal that carries signal information of the first optical signal includes the following steps:

S202-c1. The transmit-end optical splitter i of the optical cross-connect apparatus splits the first optical signal to obtain m power division optical signals with a same power.

S202-c2. The m transmit-end phase modulators i of the optical cross-connect apparatus perform, based on the m power division optical signals, first phase modulation processing to obtain m first phase modulation optical signals.

S202-c3. Them m transmit-end optical-to-electrical converters i of the optical cross-connect apparatus convert the m first phase modulation optical signals to obtain m first electrical signals.

S202-c4. The m transmit-end frequency mixers i of the optical cross-connect apparatus perform, based on the m first electrical signals and m THz carriers of the m transmit-end THz sources i, first frequency mixing processing to obtain m THz signals that carry the signal information.

Optionally, based on the optical cross-connect apparatus shown in FIG. 8.1 and FIG. 8.2, further, referring to FIG. 9.2, FIG. 9.2 is a detailed schematic flowchart of step S205 in the optical signal processing method shown in FIG. 2 according to the fourth method embodiment of the present disclosure. As shown in FIG. 9.2, step S205 in which the receive-end signal processing module j performs, based on the THz signal, second phase modulation processing and second frequency mixing processing to obtain a second optical signal that carries the signal information includes the following steps:

S205-c1. The receive-end frequency mixer j of the optical cross-connect apparatus performs, based on the m THz signals and a THz carrier of the receive-end THz source j, second frequency mixing processing to obtain a second electrical signal that carries the signal information.

S205-c2. The receive-end electrical-to-optical converter j of the optical cross-connect apparatus converts the second electrical signal to obtain a third optical signal.

S205-c3. The receive-end phase modulator j of the optical cross-connect apparatus performs, based on the third optical signal, second phase modulation processing to obtain the second optical signal that carries the signal information.

Similarly, signal input, transmission, reception, and output processes in the optical signal processing method disclosed in this embodiment of the present disclosure are consistent with step S201 (signal input), step S203 (signal transmission), step S204 (signal reception), and step S206 (signal output) in the first method embodiment of the present disclosure. Details are not further described herein.

Further, referring to FIG. 10.1 and FIG. 10.2, FIG. 10.1 and FIG. 10.2 are an optional schematic structural diagram based on the optical cross-connect apparatus shown in FIG. 1 according to a fifth apparatus embodiment of the present disclosure. As shown in FIG. 10.1 and FIG. 10.2, in the optical cross-connect apparatus:

the transmit-end signal processing module i includes a transmit-end optical signal processor i connected to the input port i, a transmit-end optical splitter i connected to the transmit-end optical signal processor i, m transmit-end phase modulators i connected to the transmit-end optical splitter i, m transmit-end optical-to-electrical converters i connected to the m transmit-end phase modulators i, m transmit-end frequency mixers i connected to the m transmit-end optical-to-electrical converters, and m transmit-end THz sources i connected to the m transmit-end frequency mixers i; the transmit-end optical signal processor i is connected to the controller; the controller is connected to the m transmit-end phase modulators i; and the transmit-end antenna i includes m transmit-end single antennas i connected to the m transmit-end frequency mixers i; and the receive-end signal processing module j includes at least one receive-end frequency mixer j connected to the receive-end antenna j, a receive-end THz source j and a receive-end electrical-to-optical converter j that are connected to the receive-end frequency mixer j, and a receive-end phase modulator j connected to the receive-end electrical-to-optical converter j; the receive-end phase modulator j is connected to the output port j; the controller is connected to the receive-end phase modulator j; and the receive-end antenna j includes at least one receive-end single antenna j connected to the at least one receive-end frequency mixer j.

Similarly, specific compositional structures of a transmit-end signal processing module connected to another input port and a transmit-end antenna of the optical cross-connect apparatus are consistent with those of the transmit-end signal processing module i connected to the input port i and the transmit-end antenna i. Specific compositional structures of a receive-end signal processing module connected to another output port and a receive-end antenna of the optical cross-connect apparatus are consistent with those of the receive-end signal processing module j connected to the output port j and the receive-end antenna j. Details are not further described herein.

In a specific implementation of the optical cross-connect apparatus, the transmit-end optical signal processor i is configured to: extract routing information of the first optical signal, send a phase modulation information obtaining request that carries the routing information to the controller, send the first phase adjustment information to the m transmit-end phase modulators i, and send the second phase adjustment information to at least one receive-end phase modulator j corresponding to the at least one receive-end frequency mixer j, where the phase modulation information obtaining request is used to instruct the controller to query a prestored routing table to obtain first phase adjustment information and second phase adjustment information that match the routing information.

The m transmit-end phase modulators i are configured to adjust a phase to a phase corresponding to the first phase adjustment information.

The at least one receive-end phase modulator j is configured to adjust a phase to a phase corresponding to the second phase adjustment information.

The transmit-end optical splitter i is configured to split the first optical signal to obtain m power division optical signals with a same power.

The m transmit-end phase modulators i are configured to perform, based on the m power division optical signals, first phase modulation processing to obtain m first phase modulation optical signals.

The m transmit-end optical-to-electrical converters i are configured to convert the m first phase modulation optical signals to obtain m first electrical signals.

The m transmit-end frequency mixers i are configured to perform, based on the m first electrical signals and m THz carriers of the m transmit-end THz sources i, first frequency mixing processing to obtain m THz signals that carry the signal information.

The receive-end frequency mixer j is configured to perform, based on the m THz signals and a THz carrier of the receive-end THz source j, second frequency mixing processing to obtain a second electrical signal that carries the signal information.

The receive-end electrical-to-optical converter j is configured to convert the second electrical signal to obtain a third optical signal.

The receive-end phase modulator j is configured to perform, based on the third optical signal, second phase modulation processing to obtain the second optical signal that carries the signal information.

Optionally, based on the optical cross-connect apparatus shown in FIG. 10.1 and FIG. 10.2, further, referring to FIG. 11.1, FIG. 11.1 is a detailed schematic flowchart of step S202 in the optical signal processing method shown in FIG. 2 according to a fourth method embodiment of the present disclosure. As shown in FIG. 11.1, step S202 in which the transmit-end signal processing module i performs, based on the first optical signal, first phase modulation processing and first frequency mixing processing to obtain a THz signal that carries signal information of the first optical signal includes the following steps:

S202-d1. The transmit-end optical signal processor i of the optical cross-connect apparatus extracts routing information of the first optical signal, sends a phase modulation information obtaining request that carries the routing information to the controller, sends the first phase adjustment information to the m transmit-end phase modulators i, and sends the second phase adjustment information to at least one receive-end phase modulator j corresponding to the at least one receive-end frequency mixer j, where the phase modulation information obtaining request is used to instruct the controller to query a prestored routing table to obtain first phase adjustment information and second phase adjustment information that match the routing information.

S202-d2. The m transmit-end phase modulators i of the optical cross-connect apparatus adjust a phase to a phase corresponding to the first phase adjustment information.

S202-d3. The at least one receive-end phase modulator j of the optical cross-connect apparatus adjusts a phase to a phase corresponding to the second phase adjustment information.

S202-d4. The transmit-end optical splitter i of the optical cross-connect apparatus splits the first optical signal to obtain m power division optical signals with a same power.

S202-d5. The m transmit-end phase modulators i of the optical cross-connect apparatus perform, based on the m power division optical signals, first phase modulation processing to obtain m first phase modulation optical signals.

S202-d6. The m transmit-end optical-to-electrical converters i of the optical cross-connect apparatus convert the m first phase modulation optical signals to obtain m first electrical signals.

S202-d7. The m transmit-end frequency mixers i of the optical cross-connect apparatus perform, based on the m first electrical signals and m THz carriers of the m transmit-end THz sources i, first frequency mixing processing to obtain m THz signals that carry the signal information.

Similarly, signal input, transmission, reception, and output processes in the optical signal processing method disclosed in this embodiment of the present disclosure are consistent with step S201 (signal input), step S203 (signal transmission), step S204 (signal reception), and step S206 (signal output) in the first method embodiment of the present disclosure. Details are not further described herein.

Optionally, based on the optical cross-connect apparatus shown in FIG. 10.1 and FIG. 10.2 further, referring to FIG. 11.2, FIG. 11.2 is a detailed schematic flowchart of step S205 in the optical signal processing method shown in FIG. 2 according to the fourth method embodiment of the present disclosure. As shown in FIG. 11.2, step S205 in which the receive-end signal processing module j performs, based on the THz signal, second phase modulation processing and second frequency mixing processing to obtain a second optical signal that carries the signal information includes the following steps:

S205-d1. The receive-end frequency mixer j of the optical cross-connect apparatus performs, based on the m THz signals and a THz carrier of the receive-end THz source j, second frequency mixing processing to obtain a second electrical signal that carries the signal information.

S205-d2. The receive-end electrical-to-optical converter j of the optical cross-connect apparatus converts the second electrical signal to obtain a third optical signal.

S205-d3. The receive-end phase modulator j of the optical cross-connect apparatus performs, based on the third optical signal, second phase modulation processing to obtain the second optical signal that carries the signal information.

Further, optionally, in an optional structure, based on the cross-connect apparatus shown in FIG. 1 according to a sixth apparatus embodiment of the present disclosure, the transmit-end signal processing module i further includes a transmit-end serial-to-parallel converter i. The transmit-end serial-to-parallel converter i is configured to divide a first high-speed signal into k first low-speed signals, where k is a positive integer greater than 1. The transmit-end antenna i includes k transmit-end antenna i subarrays corresponding to the k first low-speed signals, where k is an integer greater than 1.

The receive-end signal processing module j further includes a receive-end serial-to-parallel converter j. The receive-end serial-to-parallel converter j is configured to combine k second low-speed signals into a second high-speed signal. The receive-end antenna j includes k receive-end antenna j subarrays corresponding to the k second low-speed signals.

The k transmit-end antenna i subarrays are in a one-to-one correspondence with the k receive-end antenna j subarrays.

It should be noted that the first high-speed signal described in the foregoing optional embodiment may be any general electrical signal (such as the first electrical signal or the second electrical signal) in a processing process of the optical cross-connect apparatus. A specific electrical signal corresponding to the first high-speed signal is not uniquely limited in this embodiment of the present disclosure. Similarly, the k first low-speed signals may also be any general electrical signals in a processing process of the optical cross-connect apparatus. Details are not further described herein.

Referring to FIG. 12.1 and FIG. 12.2, FIG. 12.1 and FIG. 12.2 are an optional schematic structural diagram based on the optical cross-connect apparatus shown in FIG. 3 according to a sixth apparatus embodiment of the present disclosure. As shown in FIG. 12.1 and FIG. 12.2, in the optical cross-connect apparatus:

the transmit-end signal processing module i further includes a transmit-end serial-to-parallel converter i; the transmit-end serial-to-parallel converter i is configured to divide a signal; the transmit-end optical-to-electrical converter i is connected to the transmit-end serial-to-parallel converter i; the transmit-end serial-to-parallel converter i is connected to k transmit-end power splitters i; each of the k transmit-end power splitters i is connected to the m transmit-end phase modulation and mixing modules i; the controller is connected to k*m transmit-end phase modulation and mixing modules correspondingly connected to the k transmit-end power splitters i; the transmit-end antenna i includes k transmit-end antenna i subarrays; each of the k transmit-end antenna i subarrays includes m transmit-end single antennas i; and k is an integer greater than 1; and the receive-end signal processing module j further includes a receive-end serial-to-parallel converter j; the receive-end serial-to-parallel converter j is configured to combine signals; the receive-end antenna j includes k receive-end antenna j subarrays; each of the k receive-end antenna j subarrays includes at least one receive-end single antenna j; the receive-end single antenna j is connected to the receive-end phase modulation and mixing module j; the receive-end phase modulation and mixing module j is connected to the receive-end serial-to-parallel converter j; and the receive-end serial-to-parallel converter j is connected to the receive-end electrical-to-optical converter j.

Similarly, specific compositional structures of a transmit-end signal processing module connected to another input port and a transmit-end antenna of the optical cross-connect apparatus are consistent with those of the transmit-end signal processing module i connected to the input port i and the transmit-end antenna i. Specific compositional structures of a receive-end signal processing module connected to another output port and a receive-end antenna of the optical cross-connect apparatus are consistent with those of the receive-end signal processing module j connected to the output port j and the receive-end antenna j. Details are not further described herein.

The k transmit-end antenna i subarrays are in a one-to-one correspondence with the k receive-end antenna j subarrays. That is, in transmission and reception processes of a THz signal, m THz signals sent by a single transmit-end antenna i subarray p of the k transmit-end antenna i subarrays should be received by a single receive-end antenna j subarray q of the k receive-end antenna j subarrays. The transmit-end antenna i subarray p is any antenna subarray of the k transmit-end antenna i subarrays. The receive-end antenna j subarray q is any antenna subarray of the k receive-end antenna j subarrays.

For example, assuming that k is 3, the transmit-end antenna i subarrays include a transmit-end antenna i subarray 1, a transmit-end antenna i subarray 2, and a transmit-end antenna i subarray 3; and the receive-end antenna j subarrays include a receive-end antenna j subarray 1, a receive-end antenna i subarray 2, and a receive-end antenna i subarray 3.

m THz signals sent by the transmit-end antenna i subarray 1 should be received by the receive-end antenna j subarray 1, the receive-end antenna j subarray 2, or the receive-end antenna j subarray 3. Assuming that the m THz signals sent by the transmit-end antenna i subarray 1 are received by the receive-end antenna j subarray 2, m THz signals sent by the transmit-end antenna i subarray 2 should be received by the receive-end antenna j subarray 1 or the receive-end antenna j subarray 3. Assuming that the m THz signals sent by the transmit-end antenna i subarray 2 are received by the receive-end antenna j subarray 3, m THz signals sent by the transmit-end antenna i subarray 3 should be received by the receive-end antenna j subarray 1.

Further, optionally, in an optional structure based on the cross-connect apparatus shown in FIG. 1 according to a seventh apparatus embodiment of the present disclosure, the transmit-end signal processing module i further includes an optical demultiplexer i. The optical demultiplexer i is configured to demultiplex a first n-wavelength signal into n first single-wavelength signals. The transmit-end antenna i includes n transmit-end antenna i subarrays corresponding to the n first single-wavelength signals, where n is an integer greater than 1.

The receive-end signal processing module j further includes an optical multiplexer j, the optical multiplexer j is configured to combine n second single-wavelength signals into a second n-wavelength signal, and the receive-end antenna j includes n receive-end antenna j subarrays corresponding to the n second single-wavelength signals.

The n transmit-end antenna i subarrays are in a one-to-one correspondence with the n receive-end antenna j subarrays.

It should be noted that the first n-wavelength signal described in the foregoing optional embodiment may be any general optical signal (such as the first optical signal or an optical signal obtained by means of processing performed by an optical signal processor) in a processing process of the optical cross-connect apparatus. A specific optical signal corresponding to the first n-wavelength signal is not uniquely limited in this embodiment of the present disclosure. Similarly, the n second single-wavelength signals may also be any general optical signals in a processing process of the optical cross-connect apparatus. Details are not further described herein.

Referring to FIG. 13.1 and FIG. 13.2, FIG. 13.1 and FIG. 13.2 are an optional schematic structural diagram based on the optical cross-connect apparatus shown in FIG. 3 according to a seventh apparatus embodiment of the present disclosure. As shown in FIG. 13.1 and FIG. 13.2, in the optical cross-connect apparatus, the transmit-end signal processing module i further includes an optical demultiplexer i; the optical demultiplexer i is configured to demultiplex an optical signal; the input port i is connected to the optical demultiplexer i; the optical demultiplexer i is connected to n transmit-end optical-to-electrical converters i; the n transmit-end optical-to-electrical converters i are connected to n transmit-end power splitters i respectively; each of the n transmit-end power splitters i is connected to m transmit-end phase modulation and mixing modules i; the controller is connected to n*m transmit-end phase modulation and mixing modules i correspondingly connected to the n transmit-end power splitters i; the transmit-end antenna i includes n transmit-end antenna i subarrays; each of the n transmit-end antenna i subarrays includes m transmit-end single antennas i; and n is an integer greater than 1; and the receive-end signal processing module j further includes an optical multiplexer j; the optical multiplexer j is configured to combine optical signals; the receive-end antenna j includes n receive-end antenna j subarrays; each of the n receive-end antenna j subarrays includes at least one receive-end single antenna j; the receive-end single antenna j is connected to the receive-end phase modulation and mixing module j; the receive-end phase modulation and mixing module j is connected to the receive-end electrical-to-optical converter j; the receive-end electrical-to-optical converter j is connected to the optical multiplexer j; and the optical multiplexer j is connected to the output port j.

Similarly, specific compositional structures of a transmit-end signal processing module connected to another input port and a transmit-end antenna of the optical cross-connect apparatus are consistent with those of the transmit-end signal processing module i connected to the input port i and the transmit-end antenna i. Specific compositional structures of a receive-end signal processing module connected to another output port and a receive-end antenna of the optical cross-connect apparatus are consistent with those of the receive-end signal processing module j connected to the output port j and the receive-end antenna j. Details are not further described herein.

The n transmit-end antenna i subarrays are in a one-to-one correspondence with the n receive-end antenna j subarrays. That is, in transmission and reception processes of a THz signal, m THz signals sent by a single transmit-end antenna i subarray p of the n transmit-end antenna i subarrays should be received by a single receive-end antenna j subarray q of the n receive-end antenna j subarrays. The transmit-end antenna i subarray p is any antenna subarray of the n transmit-end antenna i subarrays. The receive-end antenna j subarray q is any antenna subarray of the n receive-end antenna j subarrays.

For example, assuming that n is 3, the transmit-end antenna i subarrays include a transmit-end antenna i subarray 1, a transmit-end antenna i subarray 2, and a transmit-end antenna i subarray 3; and the receive-end antenna j subarrays include a receive-end antenna j subarray 1, a receive-end antenna j subarray 2, and a receive-end antenna j subarray 3.

m THz signals sent by the transmit-end antenna i subarray 1 should be received by the receive-end antenna j subarray 1, the receive-end antenna j subarray 2, or the receive-end antenna j subarray 3. Assuming that the m THz signals sent by the transmit-end antenna i subarray 1 are received by the receive-end antenna j subarray 2, m THz signals sent by the transmit-end antenna i subarray 2 should be received by the receive-end antenna j subarray 1 or the receive-end antenna j subarray 3. Assuming that the m THz signals sent by the transmit-end antenna i subarray 2 are received by the receive-end antenna j subarray 3, m THz signals sent by the transmit-end antenna i subarray 3 should be received by the receive-end antenna j subarray 1.

Optionally, in the optical cross-connect apparatus described in the foregoing apparatus embodiment, the transmit-end optical-to-electrical converter i may include an adjustable laser, and the transmit-end optical-to-electrical converter i can be configured to adjust a wavelength of a signal, to avoid a wavelength conflict.

Optionally, in the optical cross-connect apparatus described in the foregoing apparatus embodiment, the transmit-end signal processing module i further includes a transmit-end optical amplifier i connected to the input port i, and the receive-end signal processing module j further includes a receive-end optical amplifier j connected to the output port j.

Optionally, in the optical cross-connect apparatus described in the foregoing apparatus embodiment, the transmit-end signal processing module i further includes a transmit-end optical signal processor i, and the receive-end signal processing module j further includes a receive-end electrical signal processor j and/or a receive-end optical signal processor j.

Referring to FIG. 14.1 and FIG. 14.2, FIG. 14.1 and FIG. 14.2 are an optional schematic structural diagram based on the optical cross-connect apparatus shown in FIG. 5 according to an eighth apparatus embodiment of the present disclosure. As shown in FIG. 14.1 and FIG. 14.2, in the optical cross-connect apparatus:

the transmit-end signal processing module i further includes a transmit-end optical amplifier i connected to the input port i, and the transmit-end optical amplifier i is connected to the transmit-end optical-to-electrical converter i; and the receive-end signal processing module j further includes a receive-end optical amplifier j connected to the output port j, and a receive-end electrical signal processor j connected to the receive-end electrical-to-optical converter j, the receive-end optical amplifier j is connected to the receive-end electrical-to-optical converter j, the receive-end electrical signal processor j is connected to the receive-end phase modulation and mixing module j, and the receive-end electrical signal processor j is configured to perform processing such as necessary power equalization, noise suppression, or digital-to-analog conversion, to improve signal transmission efficiency.

Similarly, specific compositional structures of a transmit-end signal processing module connected to another input port and a transmit-end antenna of the optical cross-connect apparatus are consistent with those of the transmit-end signal processing module i connected to the input port i and the transmit-end antenna i. Specific compositional structures of a receive-end signal processing module connected to another output port and a receive-end antenna of the optical cross-connect apparatus are consistent with those of the receive-end signal processing module j connected to the output port j and the receive-end antenna j. Details are not further described herein.

Persons of ordinary skill in the art may understand that all or a part of the steps of the methods in the embodiments may be implemented by a program instructing relevant hardware. The program may be stored in a computer-readable storage medium. The storage medium may include a flash memory, a read-only memory (ROM), a random access memory (RAM), a magnetic disk, and an optical disk.

The optical signal processing method and optical cross-connect apparatus that are disclosed in the embodiments of the present disclosure are described in detail in the foregoing. Principles and implementations of the present disclosure are described by using specific examples. The descriptions about the embodiments are provided merely to help understand the methods and the core ideas of the present disclosure. In addition, persons of ordinary skill in the art can make variations to the present disclosure regarding the specific implementations and the application scope, according to the idea of the present disclosure. Therefore, the content of the specification shall not be construed as a limitation on the present disclosure.

What is claimed is:

1. An optical signal processing method, comprising:

receiving, by an input port i of an optical cross-connect apparatus, a first optical signal, wherein the input port i is connected to a transmit-end signal processing module i of the optical cross-connect apparatus, the transmit-end signal processing module i is connected to a transmit-end antenna i and a controller of the optical cross-connect apparatus, an output port j of the optical cross-connect apparatus is connected to a receive-end signal processing module j of the optical cross-connect apparatus, the receive-end signal processing module j is connected to a receive-end antenna j and the controller of the optical cross-connect apparatus, N input ports of the optical cross-connect apparatus comprise the input port i, M output ports of the optical cross-connect apparatus comprise the output port j, and N and M are positive integers;

performing, based on the first optical signal by the transmit-end signal processing module i of the optical cross-connect apparatus, first phase modulation processing and first frequency mixing processing to obtain a terahertz (THz) signal that carries signal information of the first optical signal, wherein phase adjustment information used during first phase modulation processing comprises first phase adjustment information that matches routing information and that is from the controller, and the routing information comprises port information of the input port i and the output port j;

transmitting, by the transmit-end antenna i of the optical cross-connect apparatus, the THz signal;

receiving, by the receive-end antenna j of the optical cross-connect apparatus, the THz signal;

performing, based on the THz signal by the receive-end signal processing module j of the optical cross-connect apparatus, second phase modulation processing and second frequency mixing processing to obtain a second optical signal that carries the signal information, wherein phase adjustment information used during second phase modulation processing comprises second phase adjustment information that matches the routing information and that is from the controller; and outputting, by the output port j of the optical cross-connect apparatus, the second optical signal.

2. The method according to claim 1, wherein:

the transmit-end signal processing module i comprises a transmit-end optical-to-electrical converter connected to the input port i, a transmit-end power splitter i connected to the transmit-end optical-to-electrical converter i, and m transmit-end phase modulation and mixing modules i connected to the transmit-end power splitter i, the controller is connected to the m transmit-end phase modulation and mixing modules i, phases of m transmit-end phase modulators i in the m transmit-end phase modulation and mixing modules i comprise a phase that matches the first phase adjustment information, the transmit-end antenna i comprises m transmit-end single antennas i connected to the m transmit-end phase modulation and mixing modules and m is an integer greater than 1;

the receive-end signal processing module j comprises at least one receive-end phase modulation and mixing module j connected to the receive-end antenna j, and a receive-end electrical-to-optical converter j connected to the receive-end phase modulation and mixing module j; the receive-end electrical-to-optical converter j is connected to the output port j, the controller is connected to the receive-end phase modulation and mixing module j, a phase of a receive-end phase modulator j in the receive-end phase modulation and mixing module j comprises a phase that matches the second phase adjustment information, and the receive-end antenna j comprises at least one receive-end single antenna j connected to the at least one receive-end phase modulation and mixing module j;

performing, based on the first optical signal by the transmit-end signal processing module i, first phase modulation processing and first frequency mixing processing to obtain a THz signal that carries signal information of the first optical signal comprises:

converting, by the transmit-end optical-to-electrical converter i, the first optical signal to obtain a first electrical signal, splitting, by the transmit-end power splitter i, the first electrical signal to obtain m power division electrical signals with a same power, and performing, based on the m power division electrical signals by the m transmit-end phase modulation and mixing modules i, first phase modulation processing and first frequency mixing processing to obtain m THz signals that carry the signal information; and performing, based on the THz signal by the receive-end signal processing module j, second phase modulation processing and second frequency mixing processing to obtain a second optical signal that carries the signal information comprises:

performing, based on the m THz signals by the at least one receive-end phase modulation and mixing module j, second phase modulation processing and second frequency mixing processing to obtain a second electrical signal that carries the signal information, and converting, by the receive-end electrical-to-optical converter j, the second electrical signal to obtain the second optical signal that carries the signal information.

3. The method according to claim 1, wherein:

the transmit-end signal processing module i comprises a transmit-end optical-to-electrical converter connected to the input port i, a transmit-end electrical signal processor i connected to the transmit-end optical-to-electrical converter i, a transmit-end power splitter i connected to the transmit-end electrical signal processor i, and m transmit-end phase modulation and mixing modules i connected to the transmit-end power splitter i, the transmit-end electrical signal processor i is connected to the controller, the controller is connected to the m transmit-end phase modulation and mixing modules i, the transmit-end antenna i comprises m transmit-end single antennas i connected to the m transmit-end phase modulation and mixing modules i, and m is an integer greater than 1;

the receive-end signal processing module j comprises at least one receive-end phase modulation and mixing module j connected to the receive-end antenna j, and a receive-end electrical-to-optical converter j connected to the receive-end phase modulation and mixing module j, the receive-end electrical-to-optical converter j is connected to the output port j, the controller is connected to the receive-end phase modulation and mixing module j, and the receive-end antenna j comprises at least one receive-end single antenna j connected to the at least one receive-end phase modulation and mixing module j;

performing, based on the first optical signal by the transmit-end signal processing module i, first phase modulation processing and first frequency mixing processing to obtain a terahertz (THz) signal that carries signal information of the first optical signal comprises:
converting, by the transmit-end optical-to-electrical converter i, the first optical signal to obtain a first electrical signal,
extracting, by the transmit-end electrical signal processor i, the routing information of the first electrical signal,
sending a phase modulation information obtaining request that carries the routing information to the controller,
sending the first phase adjustment information to the m transmit-end phase modulation and mixing modules i,
sending the second phase adjustment information to the at least one receive-end phase modulation and mixing module j, wherein the phase modulation information obtaining request is used to instruct the controller to query a prestored routing table to obtain the first phase adjustment information and the second phase adjustment information that match the routing information,
adjusting, by m transmit-end phase modulators i in the m transmit-end phase modulation and mixing modules i, a phase to a phase corresponding to the first phase adjustment information,
adjusting, by a receive-end phase modulator j in the at least one receive-end phase modulation and mixing module j, a phase to a phase corresponding to the second phase adjustment information,
splitting, by the transmit-end power splitter i, the first electrical signal to obtain m power division electrical signals with a same power, and
performing, based on the m power division electrical signals by the m transmit-end phase modulation and mixing modules i, first phase modulation processing and first frequency mixing processing to obtain m THz signals that carry the signal information; and performing, based on the THz signal by the receive-end signal processing module j, second phase modulation processing and second frequency mixing processing to obtain a second optical signal that carries the signal information comprises:
performing, based on the m THz signals by the at least one receive-end phase modulation and mixing module j, second phase modulation processing and second frequency mixing processing to obtain a second electrical signal that carries the signal information, and
converting, by the receive-end electrical-to-optical converter j, the second electrical signal to obtain the second optical signal that carries the signal information.

4. The method according to claim 1, wherein:
the transmit-end signal processing module i comprises a transmit-end optical splitter i connected to the input port i, m transmit-end phase modulators i connected to the transmit-end optical splitter i, m transmit-end optical-to-electrical converters connected to the m transmit-end phase modulators i, m transmit-end frequency mixers i connected to the m transmit-end optical-to-electrical converters i, and m transmit-end THz sources i connected to the m transmit-end frequency mixers i, the controller is connected to the m transmit-end phase modulators i, phases of the m transmit-end phase modulators i comprise a phase that matches the first phase adjustment information, the transmit-end antenna i comprises m transmit-end single antennas i connected to the m transmit-end frequency mixers i, and m is an integer greater than 1;

the receive-end signal processing module j comprises at least one receive-end frequency mixer j connected to the receive-end antenna j, a receive-end THz source j connected to the receive-end frequency mixer j, a receive-end electrical-to-optical converter j connected to the receive-end frequency mixer j, and a receive-end phase modulator j connected to the receive-end electrical-to-optical converter j, the receive-end phase modulator j is connected to the output port j, and a phase of the receive-end phase modulator j comprises a phase that matches the second phase adjustment information;

performing, based on the first optical signal by the transmit-end signal processing module i, first phase modulation processing and first frequency mixing processing to obtain a THz signal that carries signal information of the first optical signal comprises:
splitting, by the transmit-end optical splitter i, the first optical signal to obtain m power division optical signals with a same power,
performing, based on the m power division optical signals by the m transmit-end phase modulators i, first phase modulation processing to obtain m first phase modulation optical signals,
converting, by the m transmit-end optical-to-electrical converters i, them first phase modulation optical signals to obtain m first electrical signals, and
performing, based on the m first electrical signals and m THz carriers of the m transmit-end THz sources i by the m transmit-end frequency mixers i, first frequency mixing processing to obtain m THz signals that carry the signal information; and performing, based on the THz signal by the receive-end signal processing module j, second phase modulation processing and second frequency mixing processing to obtain a second optical signal that carries the signal information comprises:
performing, based on the m THz signals and a THz carrier of the receive-end THz source j by the receive-end frequency mixer j, second frequency mixing processing to obtain a second electrical signal that carries the signal information,
converting, by the receive-end electrical-to-optical converter j, the second electrical signal to obtain a third optical signal, and
performing, based on the third optical signal by the receive-end phase modulator j, second phase modulation processing to obtain the second optical signal that carries the signal information.

5. The method according to claim 1, wherein:
the transmit-end signal processing module i comprises a transmit-end optical signal processor i connected to the input port i, a transmit-end optical splitter i connected to the transmit-end optical signal processor i, m transmit-end phase modulators i connected to the transmit-end optical splitter i, m transmit-end optical-to-electrical converters i connected to the m transmit-end phase modulators i, m transmit-end frequency mixers i connected to the m transmit-end optical-to-electrical converters, and m transmit-end THz sources i connected to the m transmit-end frequency mixers i, the transmit-end optical signal processor i is connected to the controller, the controller is connected to the m transmit-end phase modulators i, and the transmit-end antenna i comprises m transmit-end single antennas i connected to the m transmit-end frequency mixers i;

the receive-end signal processing module j comprises at least one receive-end frequency mixer j connected to the receive-end antenna j, a receive-end THz source j and a receive-end electrical-to-optical converter j that are connected to the receive-end frequency mixer j, and a receive-end phase modulator j connected to the receive-end electrical-to-optical converter j, the receive-end phase modulator j is connected to the output port j, the controller is connected to the receive-end phase modulator j, and the receive-end antenna j comprises at least one receive-end single antenna j connected to the at least one receive-end frequency mixer j;

performing, based on the first optical signal by the transmit-end signal processing module i, first phase modulation processing and first frequency mixing processing to obtain a terahertz (THz) signal that carries signal information of the first optical signal comprises:
   extracting, by the transmit-end optical signal processor i, routing information of the first optical signal,
   sending a phase modulation information obtaining request that carries the routing information to the controller,
   sending the first phase adjustment information to the m transmit-end phase modulators i,
   sending the second phase adjustment information to at least one receive-end phase modulator j corresponding to the at least one receive-end frequency mixer j, wherein the phase modulation information obtaining request is used to instruct the controller to query a prestored routing table to obtain first phase adjustment information and second phase adjustment information that match the routing information,
   adjusting, by them transmit-end phase modulators i, a phase to a phase corresponding to the first phase adjustment information,
   adjusting, by the at least one receive-end phase modulator j, a phase to a phase corresponding to the second phase adjustment information,
   splitting, by the transmit-end optical splitter i, the first optical signal to obtain m power division optical signals with a same power,
   performing, based on the m power division optical signals by the m transmit-end phase modulators i, first phase modulation processing to obtain m first phase modulation optical signals,
   converting, by the m transmit-end optical-to-electrical converters i, them first phase modulation optical signals to obtain m first electrical signals, and
   performing, based on the m first electrical signals and m THz carriers of the m transmit-end THz sources i by the m transmit-end frequency mixers i, first frequency mixing processing to obtain m THz signals that carry the signal information; and performing, based on the THz signal by the receive-end signal processing module j, second phase modulation processing and second frequency mixing processing to obtain a second optical signal that carries the signal information comprises:
   performing, based on the m THz signals and a THz carrier of the receive-end THz source j by the receive-end frequency mixer j, second frequency mixing processing to obtain a second electrical signal that carries the signal information,
   converting, by the receive-end electrical-to-optical converter j, the second electrical signal to obtain a third optical signal, and
   performing, based on the third optical signal by the receive-end phase modulator j, second phase modulation processing to obtain the second optical signal that carries the signal information.

6. The method according to claim 1, wherein:
the transmit-end signal processing module i further comprises a transmit-end serial-to-parallel converter i, and the transmit-end serial-to-parallel converter i is configured to divide a first high-speed signal into k first low-speed signals, wherein k is a positive integer greater than 1, and the transmit-end antenna i comprises k transmit-end antenna i subarrays corresponding to the k first low-speed signals, wherein k is an integer greater than 1;
the receive-end signal processing module j further comprises a receive-end serial-to-parallel converter j, the receive-end serial-to-parallel converter j is configured to combine k second low-speed signals into a second high-speed signal, and the receive-end antenna j comprises k receive-end antenna j subarrays corresponding to the k second low-speed signals; and
the k transmit-end antenna i subarrays are in a one-to-one correspondence with the k receive-end antenna j subarrays.

7. The method according to claim 1, wherein:
the transmit-end signal processing module i further comprises an optical demultiplexer i, the optical demultiplexer i is configured to demultiplex a first n-wavelength signal into n first single-wavelength signals, the transmit-end antenna i comprises n transmit-end antenna i subarrays corresponding to the n first single-wavelength signals, and n is an integer greater than 1;
the receive-end signal processing module j further comprises an optical multiplexer j, the optical multiplexer j is configured to combine n second single-wavelength signals into a second n-wavelength signal, and the receive-end antenna j comprises n receive-end antenna j subarrays corresponding to the n second single-wavelength signals; and
the n transmit-end antenna i subarrays are in a one-to-one correspondence with the n receive-end antenna j subarrays.

8. An optical cross-connect apparatus, comprising:
N input ports, N transmit-end signal processing modules connected to the N input ports, N transmit-end antennas and a controller that are connected to the N transmit-end signal processing modules, M receive-end antennas, M receive-end signal processing modules connected to the M receive-end antennas, and M output ports connected to the M receive-end signal processing modules, wherein:
   an input port i of the N input ports is connected to a transmit-end signal processing module i of the N transmit-end signal processing modules;

the transmit-end signal processing module i is connected to a transmit-end antenna i of the N transmit-end antennas and the controller;

an output port j of the M output ports is connected to a receive-end signal processing module j of the M receive-end signal processing modules;

the receive-end signal processing module j is connected to a receive-end antenna j of the M receive-end antennas; and N and M are positive integers;

the input port i is configured to receive a first optical signal;

the transmit-end signal processing module i is configured to perform, based on the first optical signal, first phase modulation processing and first frequency mixing processing to obtain a terahertz (THz) signal that carries signal information of the first optical signal, wherein phase adjustment information used during first phase modulation processing comprises first phase adjustment information that matches routing information and that is from the controller, and the routing information comprises port information of the input port i and the output port j;

the transmit-end antenna i is configured to transmit the THz signal;

the receive-end antenna j is configured to receive the THz signal;

the receive-end signal processing module j is configured to perform, based on the THz signal, second phase modulation processing and second frequency mixing processing to obtain a second optical signal that carries the signal information, wherein phase adjustment information used during second phase modulation processing comprises second phase adjustment information that matches the routing information and that is from the controller; and the output port j is configured to output the second optical signal.

9. The optical cross-connect apparatus according to claim 8, wherein:

the transmit-end signal processing module i comprises a transmit-end optical-to-electrical converter connected to the input port i, a transmit-end power splitter i connected to the transmit-end optical-to-electrical converter i, and m transmit-end phase modulation and mixing modules i connected to the transmit-end power splitter i, the controller is connected to the m transmit-end phase modulation and mixing modules i, phases of m transmit-end phase modulators i in the m transmit-end phase modulation and mixing modules i comprise a phase that matches the first phase adjustment information, the transmit-end antenna i comprises m transmit-end single antennas i connected to the m transmit-end phase modulation and mixing modules i, and m is an integer greater than 1;

the receive-end signal processing module j comprises at least one receive-end phase modulation and mixing module j connected to the receive-end antenna j, and a receive-end electrical-to-optical converter j connected to the receive-end phase modulation and mixing module j, the receive-end electrical-to-optical converter j is connected to the output port j, the controller is connected to the receive-end phase modulation and mixing module j, a phase of a receive-end phase modulator j in the receive-end phase modulation and mixing module j comprises a phase that matches the second phase adjustment information, and the receive-end antenna j comprises at least one receive-end single antenna j connected to the at least one receive-end phase modulation and mixing module j;

the transmit-end optical-to-electrical converter i is configured to convert the first optical signal to obtain a first electrical signal;

the transmit-end power splitter i is configured to split the first electrical signal to obtain m power division electrical signals with a same power;

the m transmit-end phase modulation and mixing modules i are configured to perform, based on the m power division electrical signals, first phase modulation processing and first frequency mixing processing to obtain m THz signals that carry the signal information;

the at least one receive-end phase modulation and mixing module j is configured to perform, based on the m THz signals, second phase modulation processing and second frequency mixing processing to obtain a second electrical signal that carries the signal information; and the receive-end electrical-to-optical converter j is configured to convert the second electrical signal to obtain the second optical signal that carries the signal information.

10. The optical cross-connect apparatus according to claim 8, wherein:

the transmit-end signal processing module i comprises a transmit-end optical-to-electrical converter connected to the input port i, a transmit-end electrical signal processor i connected to the transmit-end optical-to-electrical converter i, a transmit-end power splitter i connected to the transmit-end electrical signal processor i, and m transmit-end phase modulation and mixing modules i connected to the transmit-end power splitter i, the transmit-end electrical signal processor i is connected to the controller, the controller is connected to the m transmit-end phase modulation and mixing modules i, the transmit-end antenna i comprises m transmit-end single antennas i connected to the m transmit-end phase modulation and mixing modules i, and m is an integer greater than 1;

the receive-end signal processing module j comprises at least one receive-end phase modulation and mixing module j connected to the receive-end antenna j, and a receive-end electrical-to-optical converter j connected to the receive-end phase modulation and mixing module j, the receive-end electrical-to-optical converter j is connected to the output port j, the controller is connected to the receive-end phase modulation and mixing module j, and the receive-end antenna j comprises at least one receive-end single antenna j connected to the at least one receive-end phase modulation and mixing module j;

the transmit-end optical-to-electrical converter i is configured to convert the first optical signal to obtain a first electrical signal;

the transmit-end electrical signal processor i is configured to: extract the routing information of the first electrical signal, send a phase modulation information obtaining request that carries the routing information to the controller, send the first phase adjustment information to the m transmit-end phase modulation and mixing modules i, and send the second phase adjustment information to the at least one receive-end phase modulation and mixing module j, wherein the phase modulation information obtaining request is used to instruct the controller to query a prestored routing table to obtain the first phase adjustment information and the second phase adjustment information that match the routing information;

m transmit-end phase modulators i in the m transmit-end phase modulation and mixing modules i are configured to adjust a phase to a phase corresponding to the first phase adjustment information;

a receive-end phase modulator j in the at least one receive-end phase modulation and mixing module j is configured to adjust a phase to a phase corresponding to the second phase adjustment information;

the transmit-end power splitter i is configured to split the first electrical signal to obtain m power division electrical signals with a same power;

the m transmit-end phase modulation and mixing modules i are configured to perform, based on the m power division electrical signals, first phase modulation processing and first frequency mixing processing to obtain m THz signals that carry the signal information;

the at least one receive-end phase modulation and mixing module j is configured to perform, based on the m THz signals, second phase modulation processing and second frequency mixing processing to obtain a second electrical signal that carries the signal information; and the receive-end electrical-to-optical converter j is configured to convert the second electrical signal to obtain the second optical signal that carries the signal information.

11. The optical cross-connect apparatus according to claim 8, wherein:

the transmit-end signal processing module i comprises a transmit-end optical splitter i connected to the input port i, m transmit-end phase modulators i connected to the transmit-end optical splitter i, m transmit-end optical-to-electrical converters connected to the m transmit-end phase modulators i, m transmit-end frequency mixers i connected to the m transmit-end optical-to-electrical converters i, and m transmit-end THz sources i connected to the m transmit-end frequency mixers i, the controller is connected to the m transmit-end phase modulators i, phases of the m transmit-end phase modulators i comprise a phase that matches the first phase adjustment information, the transmit-end antenna i comprises m transmit-end single antennas i connected to the m transmit-end frequency mixers i, and m is an integer greater than 1;

the receive-end signal processing module j comprises at least one receive-end frequency mixer j connected to the receive-end antenna j, a receive-end THz source j connected to the receive-end frequency mixer j, a receive-end electrical-to-optical converter j connected to the receive-end frequency mixer j, and a receive-end phase modulator j connected to the receive-end electrical-to-optical converter j, the receive-end phase modulator j is connected to the output port j, and a phase of the receive-end phase modulator j comprises a phase that matches the second phase adjustment information;

the transmit-end optical splitter i is configured to split the first optical signal to obtain m power division optical signals with a same power;

the m transmit-end phase modulators i are configured to perform, based on the m power division optical signals, first phase modulation processing to obtain m first phase modulation optical signals;

the m transmit-end optical-to-electrical converters i are configured to convert the m first phase modulation optical signals to obtain m first electrical signals;

the m transmit-end frequency mixers i are configured to perform, based on the m first electrical signals and m THz carriers of the m transmit-end THz sources i, first frequency mixing processing to obtain m THz signals that carry the signal information;

the receive-end frequency mixer j is configured to perform, based on the m THz signals and a THz carrier of the receive-end THz source j, second frequency mixing processing to obtain a second electrical signal that carries the signal information;

the receive-end electrical-to-optical converter j is configured to convert the second electrical signal to obtain a third optical signal; and the receive-end phase modulator j is configured to perform, based on the third optical signal, second phase modulation processing to obtain the second optical signal that carries the signal information.

12. The optical cross-connect apparatus according to claim 8, wherein:

the transmit-end signal processing module i comprises a transmit-end optical signal processor i connected to the input port i, a transmit-end optical splitter i connected to the transmit-end optical signal processor i, m transmit-end phase modulators i connected to the transmit-end optical splitter i, m transmit-end optical-to-electrical converters i connected to the m transmit-end phase modulators i, m transmit-end frequency mixers i connected to the m transmit-end optical-to-electrical converters, and m transmit-end THz sources i connected to the m transmit-end frequency mixers i, the transmit-end optical signal processor i is connected to the controller, the controller is connected to the m transmit-end phase modulators i, and the transmit-end antenna i comprises m transmit-end single antennas i connected to the m transmit-end frequency mixers i;

the receive-end signal processing module j comprises at least one receive-end frequency mixer j connected to the receive-end antenna j, a receive-end THz source j and a receive-end electrical-to-optical converter j that are connected to the receive-end frequency mixer j, and a receive-end phase modulator j connected to the receive-end electrical-to-optical converter j, the receive-end phase modulator j is connected to the output port j, the controller is connected to the receive-end phase modulator j, and the receive-end antenna j comprises at least one receive-end single antenna j connected to the at least one receive-end frequency mixer j;

the transmit-end optical signal processor i is configured to:
extract routing information of the first optical signal,
send a phase modulation information obtaining request that carries the routing information to the controller,
send the first phase adjustment information to the m transmit-end phase modulators i, and
send the second phase adjustment information to at least one receive-end phase modulator j corresponding to the at least one receive-end frequency mixer j, wherein the phase modulation information obtaining request is used to instruct the controller to query a prestored routing table to obtain first phase adjustment information and second phase adjustment information that match the routing information;

the m transmit-end phase modulators i are configured to adjust a phase to a phase corresponding to the first phase adjustment information;

the at least one receive-end phase modulator j is configured to adjust a phase to a phase corresponding to the second phase adjustment information;

the transmit-end optical splitter i is configured to split the first optical signal to obtain m power division optical signals with a same power;

the m transmit-end phase modulators i are configured to perform, based on the m power division optical signals, first phase modulation processing to obtain m first phase modulation optical signals;

the m transmit-end optical-to-electrical converters i are configured to convert the m first phase modulation optical signals to obtain m first electrical signals;

the m transmit-end frequency mixers i are configured to perform, based on the m first electrical signals and m THz carriers of the m transmit-end THz sources i, first frequency mixing processing to obtain m THz signals that carry the signal information;

the receive-end frequency mixer j is configured to perform, based on the m THz signals and a THz carrier of the receive-end THz source j, second frequency mixing processing to obtain a second electrical signal that carries the signal information;

the receive-end electrical-to-optical converter j is configured to convert the second electrical signal to obtain a third optical signal; and the receive-end phase modulator j is configured to perform, based on the third optical signal, second phase modulation processing to obtain the second optical signal that carries the signal information.

13. The optical cross-connect apparatus according to claim 8, wherein:

the transmit-end signal processing module i further comprises a transmit-end serial-to-parallel converter I, the transmit-end serial-to-parallel converter i is configured to divide a first high-speed signal into k first low-speed signals, wherein k is a positive integer greater than 1, and the transmit-end antenna i comprises k transmit-end antenna i subarrays corresponding to the k first low-speed signals, wherein k is an integer greater than 1;

the receive-end signal processing module j further comprises a receive-end serial-to-parallel converter j, the receive-end serial-to-parallel converter j is configured to combine k second low-speed signals into a second high-speed signal, and the receive-end antenna j comprises k receive-end antenna j subarrays corresponding to the k second low-speed signals; and the k transmit-end antenna i subarrays are in a one-to-one correspondence with the k receive-end antenna j subarrays.

14. The optical cross-connect apparatus according to claim 8, wherein:

the transmit-end signal processing module i further comprises an optical demultiplexer i, the optical demultiplexer i is configured to demultiplex a first n-wavelength signal into n first single-wavelength signals, the transmit-end antenna i comprises n transmit-end antenna i subarrays corresponding to the n first single-wavelength signals, and n is an integer greater than 1;

the receive-end signal processing module j further comprises an optical multiplexer j, the optical multiplexer j is configured to combine n second single-wavelength signals into a second n-wavelength signal, and the receive-end antenna j comprises n receive-end antenna j subarrays corresponding to the n second single-wavelength signals; and the n transmit-end antenna i subarrays are in a one-to-one correspondence with the n receive-end antenna j subarrays.

* * * * *